(12) United States Patent
Trivelpiece et al.

(10) Patent No.: US 10,325,464 B1
(45) Date of Patent: Jun. 18, 2019

(54) SYSTEMS AND METHODS FOR SECURITY TAG DETACHMENT OR DEACTIVATION

(71) Applicants: Steve E. Trivelpiece, Rancho Santa Margarita, CA (US); Craig E. Trivelpiece, Mission Viejo, CA (US); David Torrecilla, Madrid (ES); Adam S. Bergman, Boca Raton, FL (US)

(72) Inventors: Steve E. Trivelpiece, Rancho Santa Margarita, CA (US); Craig E. Trivelpiece, Mission Viejo, CA (US); David Torrecilla, Madrid (ES); Adam S. Bergman, Boca Raton, FL (US)

(73) Assignee: Sensormatics Electronics LLC, Boca Raton, FL (US)

( * ) Notice: Subject to any disclaimer, the term of this patent is extended or adjusted under 35 U.S.C. 154(b) by 0 days.

(21) Appl. No.: 15/946,501

(22) Filed: Apr. 5, 2018

Related U.S. Application Data

(60) Provisional application No. 62/635,684, filed on Feb. 27, 2018.

(51) Int. Cl.
| | | |
|---|---|---|
| *H04L 9/14* | (2006.01) | |
| *G08B 13/24* | (2006.01) | |
| *H04W 12/06* | (2009.01) | |

(52) U.S. Cl.
CPC ......... *G08B 13/242* (2013.01); *G08B 13/246* (2013.01); *H04L 9/14* (2013.01); *H04W 12/06* (2013.01); *G08B 13/2434* (2013.01); *H04L 2209/805* (2013.01)

(58) Field of Classification Search
CPC .......................... G08B 13/246; E05B 73/0017

USPC ...................................................... 340/572.1
See application file for complete search history.

(56) References Cited

U.S. PATENT DOCUMENTS

| | | | | |
|---|---|---|---|---|
| 6,025,780 A | * | 2/2000 | Bowers | G06K 19/0701 340/572.3 |
| 2005/0190060 A1 | * | 9/2005 | Clancy | G08B 13/246 340/572.9 |
| 2006/0133606 A1 | * | 6/2006 | Eberwein | G06F 21/35 380/30 |
| 2007/0019110 A1 | * | 1/2007 | Cho | H04N 5/44 348/554 |
| 2009/0224918 A1 | * | 9/2009 | Copeland | E05B 73/0017 340/572.1 |
| 2010/0176926 A1 | * | 7/2010 | Jo | H04W 72/082 340/10.2 |

(Continued)

*Primary Examiner* — Fabricio R Murillo Garcia
(74) *Attorney, Agent, or Firm* — Fox Rothschild LLP; Robert J. Sacco; Carol E. Thorstad-Forsyth

(57) ABSTRACT

Systems and methods for operating a security tag. The methods involve: receiving, by the security tag, an authorization code comprising a security tag identifier signed using a cryptographic key of a plurality of cryptographic keys that are respectively assigned to a plurality of security tags; performing operations by the security tag to verify a signature of the authorization code; and performing detach operations or deactivation operations by the security tag, responsive to the signature's verification. The detach operations cause a mechanical detachment of the security tag from an item. The deactivation operations cause a disablement of a response by the security tag to an interrogation signal from a Radio Frequency Identification ("RFID") system or an Electronic Article Surveillance ("EAS") system.

20 Claims, 18 Drawing Sheets

(56) References Cited

U.S. PATENT DOCUMENTS

2010/0308978 A1* 12/2010 Brown .................. H04L 9/3252
340/10.42
2012/0242481 A1* 9/2012 Gernandt ........... G06K 19/0705
340/539.13
2017/0206273 A1* 7/2017 Tannenbaum .... G06F 17/30778

* cited by examiner

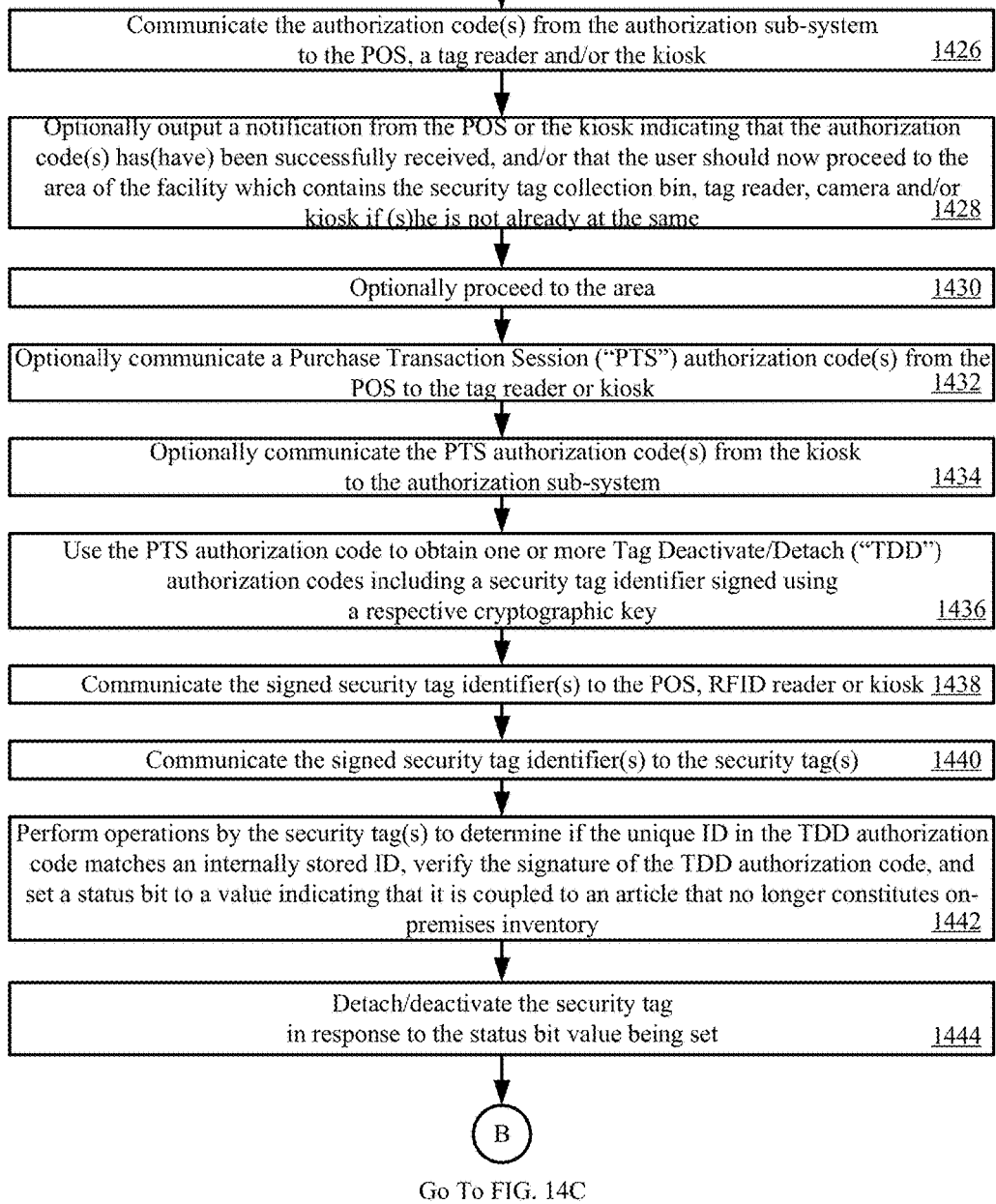

From FIG. 14B

FIG. 14C

Optionally perform operations by an enterprise system to verify that the security tag was removed from the article based on (a) images captured by a camera in proximity to the POS, RFID reader or kiosk, and/or (b) system intelligence of the security tag's motion, path of travel through the facility, and last known location 1446

Was the security tag's detachment verified? 1448

No → Output an alarm from the security tag/POS/tag reader/kiosk, notify store personnel, and/or go to 1458 1450

Yes ↓

Optionally present to the user a request to place the security tag in the collection bin 1452

Have the security tags for all of the purchased articles been detached? 1454

No → Return to step 1440 of FIG. 14B 1456

Yes ↓

End or perform other processing 1458

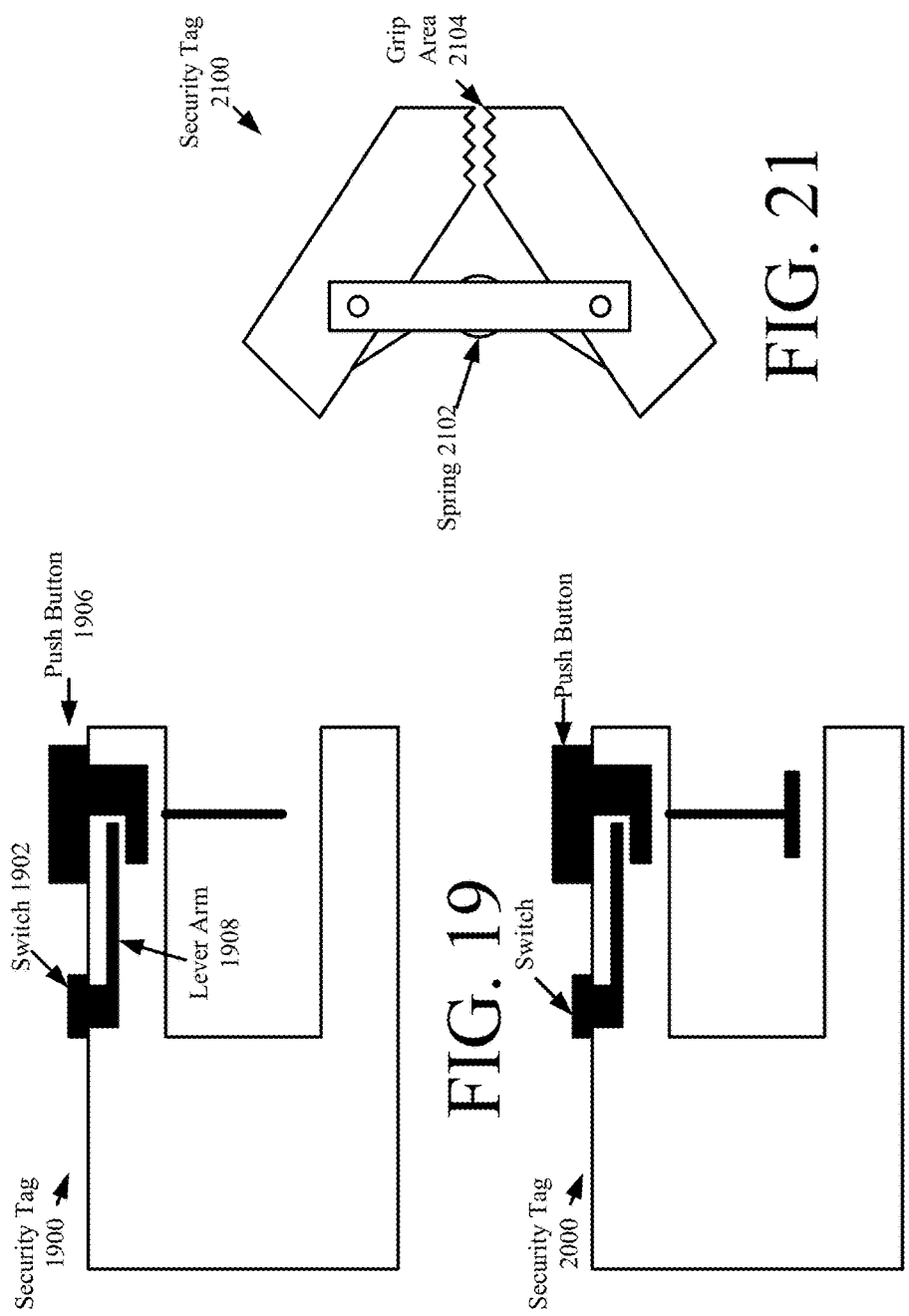

SYSTEMS AND METHODS FOR SECURITY TAG DETACHMENT OR DEACTIVATION

CROSS-REFERENCE TO RELATED APPLICATIONS

The present application claims priority to U.S. Provisional Patent Application No. 62/635,684, filed on Feb. 27, 2018. This Provisional Patent Application is incorporated herein in its entirety.

BACKGROUND

Statement of the Technical Field

The present disclosure relates generally to inventory systems. More particularly, the present disclosure relates to implementing systems and methods for systems and methods for security tag detachment or deactivation.

Description of the Related Art

Electronic Article Surveillance ("EAS") systems are often used by retail stores in order to minimize loss due to theft. One common way to minimize retail theft is to attach a security tag to an article such that an unauthorized removal of the article can be detected. In some scenarios, a visual or audible alarm is generated based on such detection. For example, a security tag with an EAS element (e.g., an acousto-magnetic element) can be attached to an article offered for sale by a retail store. An EAS interrogation signal is transmitted at the entrance and/or exit of the retail store. The EAS interrogation signal causes the EAS element of the security tag to produce a detectable response if an attempt is made to remove the article without first detaching the security tag therefrom. The security tag must be detached from the article upon purchase thereof in order to prevent the visual or audible alarm from being generated.

One type of EAS security tag can include a tag body which engages a tack. The tack usually includes a tack head and a sharpened pin extending from the tack head. In use, the pin is inserted through the article to be protected. The shank or lower part of the pin is then locked within a cooperating aperture formed through the housing of the tag body. In some scenarios, the tag body may contain a Radio Frequency Identification ("RFID") element or label. The RFID element can be interrogated by an RFID reader to obtain RFID data therefrom.

The EAS security tag may be removed or detached from the article using a detaching unit. Examples of such detaching units are disclosed in U.S. Pat. No. 5,426,419 ("the '419 patent), U.S. Pat. No. 5,528,914 ("the '914 patent"), U.S. Pat. No. 5,535,606 ("the '606 patent"), U.S. Pat. No. 5,942,978 ("the '978 patent") and U.S. Pat. No. 5,955,951 ("the '951 patent"). The detaching units disclosed in the listed patents are designed to operate upon a two-part hard EAS security tag. Such an EAS security tag comprises a pin and a molded plastic enclosure housing EAS marker elements. During operation, the pin is inserted through an article to be protected (e.g., a piece of clothing) and into an aperture formed through at least one sidewall of the molded plastic enclosure. The pin is securely coupled to the molded plastic enclosure via a clamp disposed therein. The pin is released by a detaching unit via a probe. The probe is normally retracted within the detaching unit. Upon actuation, the probe is caused to travel out of the detaching unit and into the enclosure of the EAS security tag so as to release the pin from the clamp or disengage the clamp from the pin. Once the pin is released from the clamp, the EAS security tag can be removed from the article.

While EAS security tags help reduce retail theft, improper use of the detaching unit is an ever growing problem that is inhibiting the effectiveness of the security tags. For example, an unscrupulous store employee may conspire to allow customers to steal merchandise by a practice known as "sweethearting". "Sweethearting" involves collusion between the store employee and a customer. Typically, a cashier scans an inexpensive item for the customer to ring a sale and apparently complete the transaction. But then the cashier uses a detaching unit to remove the EAS security tag from a much more expensive item which was not scanned. The customer is then free to leave the premises with the expensive item without having paid therefore. In effect, "sweethearting" can cost businesses a relatively large amount of dollars each year.

SUMMARY

The present disclosure concerns implementing systems and methods for operating a security tag. The methods comprise: receiving, by the security tag, an authorization code comprising a security tag identifier signed using a cryptographic key of a plurality of cryptographic keys that are respectively assigned to a plurality of security tags (e.g., from a Point Of Sale ("POS") terminal); performing operations by the security tag to verify a signature of the authorization code; and performing detach operations or deactivation operations by the security tag, responsive to the signature's verification. The detach operations cause a mechanical detachment of the security tag from an item and the deactivation operations cause a disablement of a response by the security tag to an interrogation signal from an RFID and/or EAS system.

In some scenarios, a least one of the detach operations and the deactivation operations comprise setting a status bit to a value indicating that the security tag is coupled to an article that no longer constitutes inventory to be sold or loaned. The detach operations further comprise withdrawing a pin of the security tag, withdrawing a pad of the security tag, or actuating a first mechanical component of the security tag to allow motion of a second mechanical component of the security tag.

In those or other scenarios, the methods also comprise: performing operations by the security tag to notify an enterprise system of the security tag's mechanical detachment from an item or the disablement of the security tag's ability to respond to the interrogation signal; and performing operations by the enterprise system to verify that the security tag was actually removed from the article. The security tag's removal is verified based on contents of captured images and/or system intelligence of the security tag's motion, the security tag's path of travel through a facility, and the security tag's last known location within the facility. The system intelligence may be obtained using information received from the security tag when the security tag was in motion and during time slots of a plurality of time slots that are allocated to other security tags. An alert is output from the security tag when authorization of the security tag's detachment is not verified by the enterprise system.

BRIEF DESCRIPTION OF THE DRAWINGS

The present solution will be described with reference to the following drawing figures, in which like numerals represent like items throughout the figures.

FIGS. 14A-14C (collectively referred to as "FIG. 14") provide a flow diagram of an illustrative method for security tag detachment or deactivation.

FIGS. 15-21 each provide an illustration of an illustrative security tag architecture.

DETAILED DESCRIPTION

Figure 1:
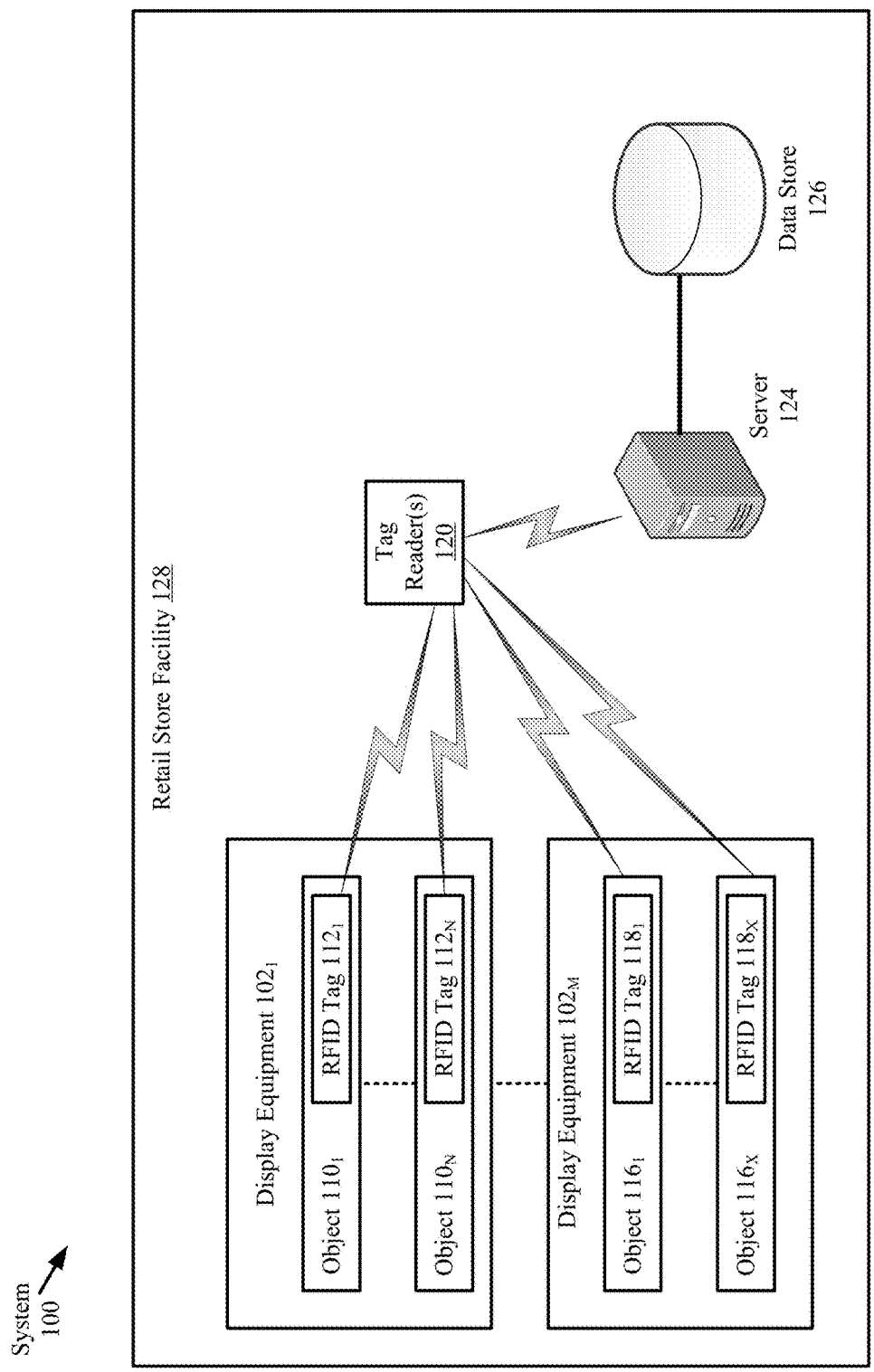
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Mobile shopping apps, shopping websites and self-checkout solutions are becoming more prevalent in retail stores. Presently, there is no way for a retail store to provide a customer with authorization to detach and/or deactivate security tags attached to protected retail items. Accordingly when a customer uses a Mobile Point Of Sale ("MPOS") device or a self-checkout kiosk, the security tags attached to the purchased products trigger an alarm at a retail store's exit. For tag deactivation, some retailers have a deactivation device tied to a fixed POS. Deactivation of a security tag is only enabled when there is a scanned Unique Product Code ("UPC"). However, there is no verification that the correct security tag is deactivated.

The systems and methods discussed herein allow authorization of security tag detachment/deactivation by a customer after completing a successful purchase transaction. Accordingly, the present solution facilitates the use of mobile shopping applications, shopping websites and self-checkout solutions in retail establishments that would not be possible due to the use of security tags. The present solution provides advantages to retailers by (1) reducing labor costs for checkout and security tag detachment/deactivation and (2) allowing better management of influx of customers due to mobile checkout options available. The present solution also provides advantages to customers by (1) allowing customers to self-pay using a mobile shopping applications, shopping websites and self-checkout solutions in store with products protected by security tags. As such, there is no need for the customers to stand and wait in checkout lines.

The present solution can be implemented in any known or to be known a Radio Frequency Identification ("RFID") system, EAS, and/or inventory system. In some scenarios, the present solution is employed in a novel time slot based inventory system. Such a system is described below. Thereafter, various methods for security tag detachment and/or deactivation are described.

Time Slot Based Inventory Systems

One aspect of the present solution generally concerns systems and methods for determining and tracking inventory using time slotted tag communications. This aspect of the present solution solves the following problems:

how to have a battery assisted passive RFID tag without constant battery drain caused by constant inventory reading which is needed to monitor tag motion and for full inventory count;

how to have a battery assisted passive RFID tag with great read range without having very large numbers of tags constantly attempting to communicate causing delays and communication collisions;

how to have a battery assisted passive RFID tag that can still be read often enough for a full inventory count in an area; and how to enable detection of a tag that is being moved or stolen.

The present solution can use standard RFID tags and readers (with a software update) but could be designed to incorporate the functioning into a new and compatible RFID tag chip as well. Initially, the RFID tag would need to be supplemented with a rechargeable power source (e.g., a battery and/or a capacitor), a Central Processing Unit ("CPU"), an accelerometer and/or motion detector.

Just as in normal RFID implementations, RFID tag readers are constantly scanning their Field Of View ("FOV") and requesting that all tags in its coverage area respond to interrogation signals. The present solution solves these problems with two novel features: (A) time based RFID tag communications control (e.g., disabling a receiver, disabling a transceiver or transmitter, disabling a communications operation, bypassing a communications device or operation, and/or disabling a response from the RFID tag); and (B) motion based RFID tag communications control. The RFID tag control of (A) involves controlling the RFID tag so that it only enables its communications functionality (e.g., enables a receiver, enables a transceiver or transmitter, enables at least one communications operation, and/or discontinues a bypass of a communications device or operation) periodically under system control. This is for improved static inventory counting. The RFID communications control of (B) involves turning on, enabling or no longer bypassing the RFID receiver, the RFID transceiver/transmitter and/or at least one communications operation when motion is detected and continuing to receive interrogation signals while in motion. This is for loss prevention and tag location tracking.

Novel feature (A) provides better full inventory counts. In the present solution, the RFID chip is scheduled to only enable (or turn on) or no longer bypass its communication device (e.g., a transceiver) or communications operation(s) one or two times a day, and to disable (or turn off) or bypass its communication device (e.g., transceiver) or communications operation(s) after communication with a tag reader completes or a timing window expires. The timing of the RFID tag communications is distributed over a given time period (e.g., a day or 24 hours) so that any time slot will only be assigned to a very small percentage of the RFID tags. This enables fast reading cycles, minimizes communications collisions, and enables identifying every tag.

Novel feature (A) also vastly reduces the RFID tags' battery drain. The main power drain on the battery is from the receiver and CPU. In the present solution, these components are only active for a few seconds per day (out of 86,400 seconds). The rest of the time the RFID tags can capture energy for charging the battery from the received RF energy and other sources of energy harvesting. This allows for a very small, low cost rechargeable battery or capacitor. A rechargeable energy storage is not required. For some applications, a primary battery (e.g., a lithium coin cell) can be used without recharging. If a small battery can supply energy for the expected life time of the tag, then a fixed battery could be used to reduce the costs. For example, a swing ticket could have a small battery that lasts less than one year.

Novel feature (A) further improves tag read range which reduces infrastructure costs. Using battery assisted tags changes the tag read range from, for example, 1-10 meters to 15-100 meters. This significantly reduces infrastructure installation costs since less tag readers are needed to cover a given area as compared to that needed in conventional systems, while improving overall performance in previously hard to read areas.

Novel feature (B) ensures that tags in motion respond to interrogation signals even at times when they are not scheduled to communicate during time slots. The system can now track an RFID tag while it is in motion and also detect where/when this tag motion stops. Novel feature (B) also facilitates better inventory counts, improved read ranges, and reduced infrastructure costs.

Referring now to FIG. 1, there is provided a schematic illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow improved inventory counts of objects and/or items located within a facility. As shown in FIG. 1, system 100 comprises a Retail Store Facility ("RSF") 128 in which display equipment $102_1, \ldots, 102_M$ (collectively referred to as "102") is disposed. The display equipment is provided for displaying objects (or items) $110_1$-$110_N$ (collectively referred to as "110"), $116_1$-$116_X$ (collectively referred to as "116") to customers of the retail store. The display equipment can include, but is not limited to, shelves, article display cabinets, promotional displays, fixtures and/or equipment securing areas of the RSF 128. The RSF can also include emergency equipment (not shown), checkout counters, an EAS system (not shown), an RFID system, and/or an RFID/EAS system. Emergency equipment, checkout counters, video cameras, people counters, EAS systems, RFID systems, and/or RFID/EAS systems are well known in the art, and therefore will not be described herein.

At least one tag reader 120 is provided to assist in counting the objects $110_1$-$110_N$, $116_1$-$116_X$ located within the RSF 128. The tag reader 120 comprises an RFID reader configured to read RFID tags. RFID readers are well known in the art, and therefore will not be described herein. Any known or to be known RFID reader can be used herein without limitation.

RFID tags $112_1$-$112_N$ (collectively referred to as "112"), $118_1$-$118_X$ (collectively referred to as "118") are respectively attached or coupled to the objects $110_1$-$110_N$, $116_1$-$116_X$. The RFID tags are described herein as comprising single-technology tags that are only RFID enabled. The present solution is not limited in this regard. The RFID tags can alternatively or additionally comprise dual-technology tags that have both EAS and RFID capabilities. In some scenarios, the RFID enabled tags comprise RFID thread based tags.

Notably, the tag reader 120 is strategically placed at a known location within the RSF 128. By correlating the tag reader's RFID tag reads and the tag reader's known location within the RSF 128, it is possible to determine the location of objects $110_1, \ldots, 110_N, 116_1, \ldots, 116_X$ within the RSF 128. The tag reader's known coverage area also facilitates object location determinations. Accordingly, RFID tag read information and tag reader location information is stored in a data store 126. This information can be stored in the data store 126 using a server 124. Server 124 will be described in more detail below in relation to FIG. 4.

Figure 2:
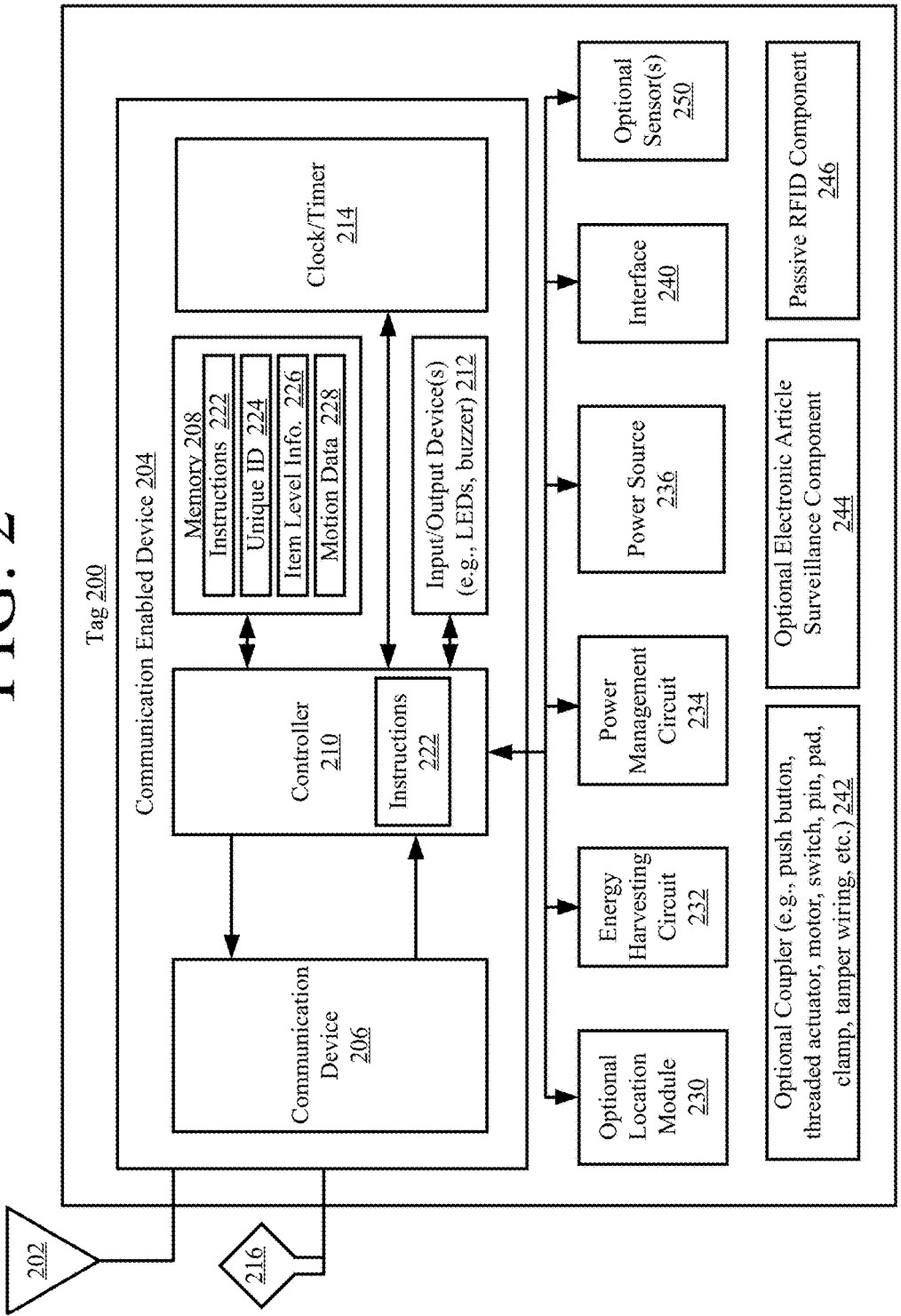
FIG. 2 is an illustration of an illustrative architecture for a tag.

Referring now to FIG. 2, there is an illustration of an illustrative architecture for a tag 200. RFID tags $112_1, \ldots, 112_N, 118_1, \ldots, 118_X$ are the same as or similar to tag 200. As such, the discussion of tag 200 is sufficient for understanding the RFID tags $112_1, \ldots, 112_N, 118_1, \ldots, 118_X$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management. In this regard, the tag 200 is configured for allowing data to be exchanged with an external device (e.g., tag reader 120 of FIG. 1 and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology; WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM") and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology and/or a SRC technology). The antenna 202, 216 is configured to receive signals from the external device and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 112 of FIG. 1) to which the tag 200 is coupled.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when and/or in response to when motion is detected by the motion sensor 250. The WOT can be determined based on environmental conditions (e.g., humidity, temperature, time of day, relative distance to a location device (e.g., beacon or location tag), a last known location of the security tag, an tag's internal bit value indicating whether the tag is coupled to a purchased item, etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1 and/or server 124 of FIG. 1) via communication device (e.g., transceiver) 206 and/or interface 240 (e.g., an Internet Protocol or cellular network interface). For example, the communication enabled device 204 can communicate information specifying a timestamp, a unique identifier for an item, item description, item price, a currency symbol and/or location information to an external device. The external device (e.g., server) can then store the information in a database (e.g., database 126 of FIG. 1) and/or use the information for various purposes.

The communication enabled device 204 also comprises a controller 210 (e.g., a CPU) and input/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the tag 200. The memory 208 and the controller 210 also can constitute machine-readable media. The term "machine-readable media", as used here, refers to a single medium or multiple media (e.g., a centralized or distributed database, and/or associated caches and servers) that store the one or more sets of instructions 222. The term "machine-readable media", as used here, also refers to any medium that is capable of storing, encoding or carrying a set of instructions 222 for execution by the tag 200 and that cause the tag 200 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 242 is provided to securely or removably couple the tag 200 to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional EAS component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data can be compared to stored motion data 228 to determine if a match exists therebetween. More specifically, a motion pattern specified by the sensor data can be compared to a plurality of motion patterns specified by the stored motion data 228. The plurality of motion patterns can include, but are not limited to, a motion pattern for walking, a motion pattern for running, a motion pattern for vehicle transport, and/or a motion pattern for vibration caused by equipment or machinery in proximity to the tag (e.g., an air conditioner or fan). The type of movement (e.g., vibration or being carried) is then determined based on which stored motion data matches the sensor data. This feature of the present solution allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag can be transitioned from its sleep state in response to expiration a defined time period, the tag's reception of a control signal from an external device, and/or the tag's detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee) so that (s)he can investigate why the tag 200 is not recharging and/or holding charge.

The power management circuit 234 is also capable of redirecting an energy source to the tag's 200 electronics based on the energy source's status. For example, if harvested energy is sufficient to run the tag's 200 function, the power management circuit 234 confirms that all of the tag's 200 storage sources are fully charged such that the tag's 200 electronic components can be run directly from the harvested energy. This ensures that the tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee) so that (s)he can investigate the issue. It may be that other merchandise are obscuring the harvesting source or the item is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) bypass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating a closed or open circuit. The present solution is not limited in this regard.

Figure 3:
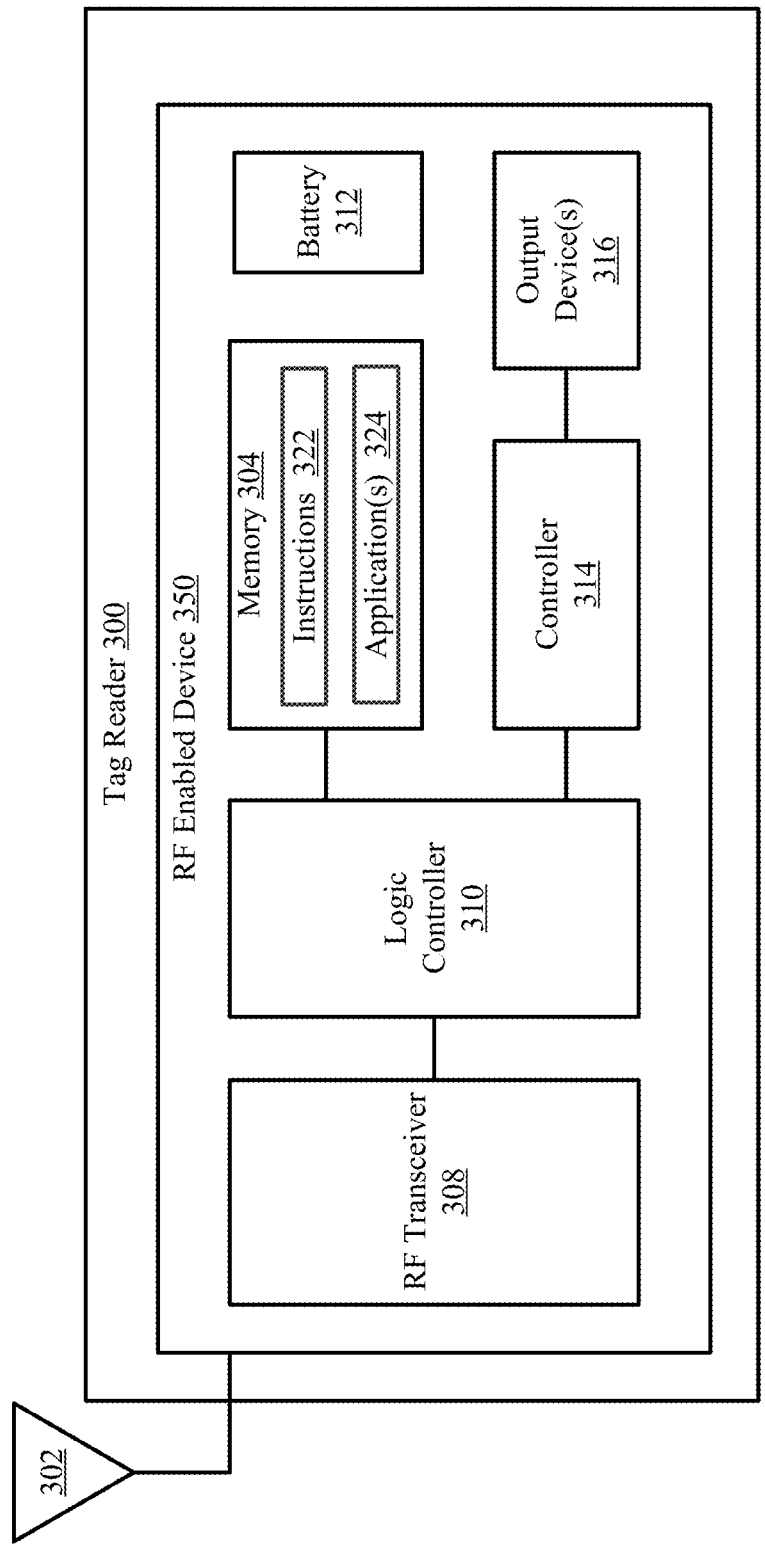
FIG. 3 is an illustration of an illustrative architecture for a tag reader.

Referring now to FIG. 3, there is provided a detailed block diagram of an exemplary architecture for a tag reader 300.

Tag reader 120 of FIG. 1 is the same as or similar to tag reader 200. As such, the discussion of tag reader 200 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 200 comprises an RF enabled device 350 for allowing data to be exchanged with an external device (e.g., RFID tags $112_1, \ldots, 112_N, 118_1, \ldots, 118_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise RFID tags $112_1, \ldots, 112_N, 118_1, \ldots, 118_X$ of FIG. 1. In this case, the antenna 302 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is(are) to be turned on when motion is detected thereby, and communicate the same to the given RFID tag. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, and/or which RFID tags are in motion at any given time. Other functions of the RF enabled device 350 will become apparent as the discussion progresses.

Figure 4:
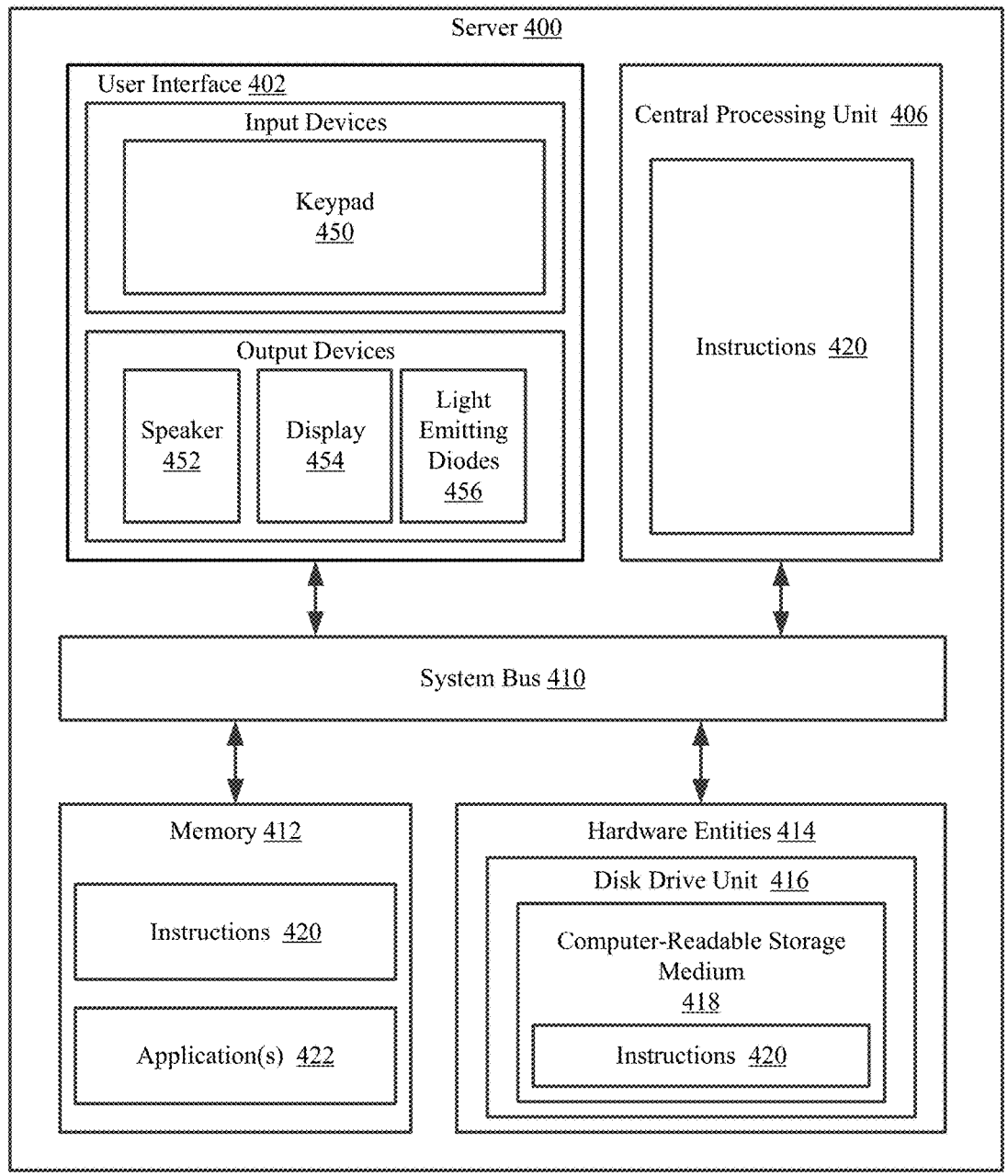
FIG. 4 is an illustration of an illustrative architecture for a server.

Referring now to FIG. 4, there is provided a detailed block diagram of an exemplary architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate inventory counts and management. As such, the server 400 of FIG. 4 implements at least a portion of a method for determining inventory using time slotted tag communications in accordance with the present solution.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the server 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 422 installed on the server 400. The software application 422 is generally operative to facilitate: the determination of RFID tag locations within a facility; the direction of travel of RFID tags in motion; and the mapping of the RFID tag locations and movements in a virtual three dimensional space. Other functions of the software application 422 will become apparent as the discussion progresses. Such other functions can relate to tag reader control and/or tag control.

Figure 6:
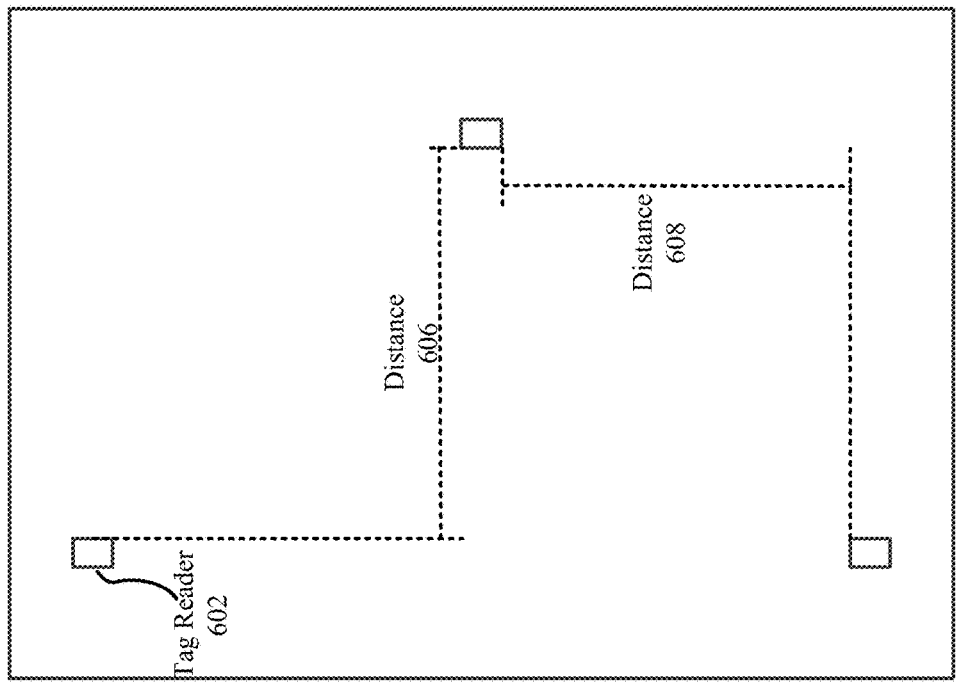
FIG. 6 is an illustration of another illustrative tag reader configuration.
Figure 5:
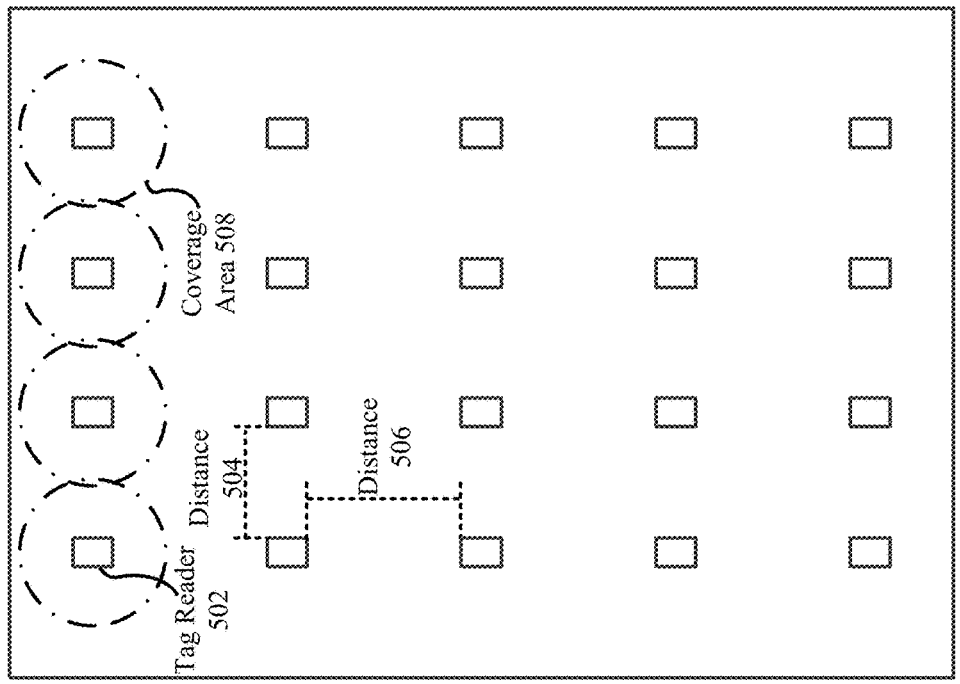
FIG. 5 is an illustration of an illustrative tag reader configuration.

Referring now to FIGS. 5-6, there are provided illustrations that are useful for understanding certain advantages of the present solution. As noted above, the present solution provides RFID tags which can be read by a tag reader located farther away therefrom as compared to that of conventional systems. FIG. 5 shows a tag reader layout for a conventional system. In FIG. 5, there are 20 tag readers 502 with overlapping coverage areas 508. The distance 504, 506 between adjacent tag readers is relatively small (e.g., 9-15 feet apart). In contrast, FIG. 6 shows a tag reader layout for a system implementing the present solution. In FIG. 6, there are advantageously a significantly smaller number of tag readers 602 needed to cover the same area. Accordingly, the distances 606, 608 (e.g., 90-150 feet apart) between adjacent tag readers 602 is much greater than the distances 504, 506 of FIG. 5. Consequently, the present solution has a less resource intensive and less costly infrastructure.

Figure 7A:
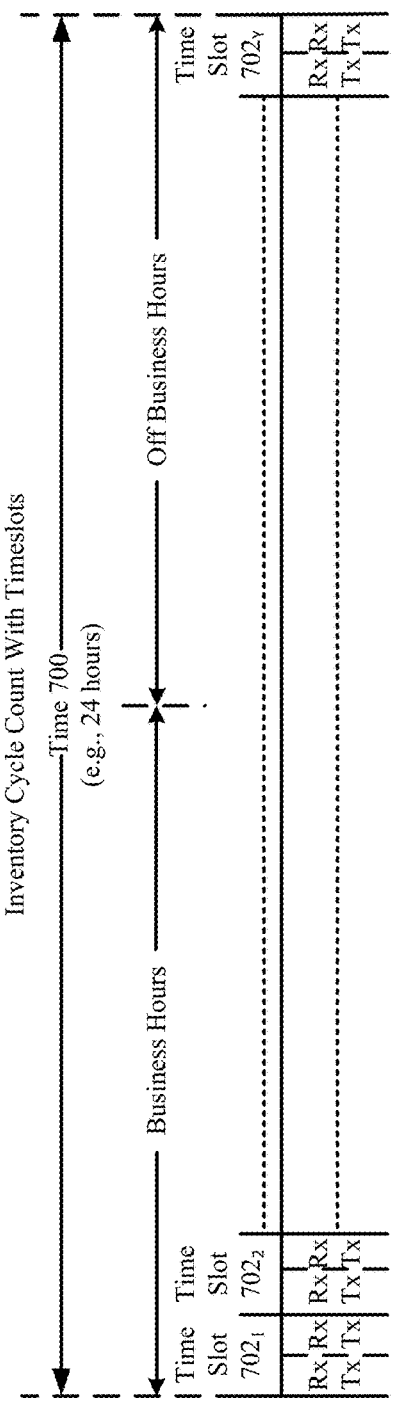
FIGS. 7A-7B (collectively referred to herein as "FIG. 7") provide illustrations that are useful for understanding an inventory cycle count using time slots for communications between tag readers and tags.

Referring now to FIG. 7, there are provided illustrations that are useful for understanding methods for determining inventory using time slotted tag communications. As shown in FIG. 7A, a period of time 700 (e.g., a 24 hour period) is segmented into a plurality of time slots $702_1, 702_2, \ldots, 702_Y$ having equal lengths (e.g., 1 second). During each time slot, at least one RFID tag (e.g., RFID tag $112_1$ of FIG. 1) (A) receives ("Rx") an interrogation signal transmitted from a tag reader (e.g., tag reader 120 of FIG. 1) and (B) transmits ("Tx") a response signal.

Figure 7B:
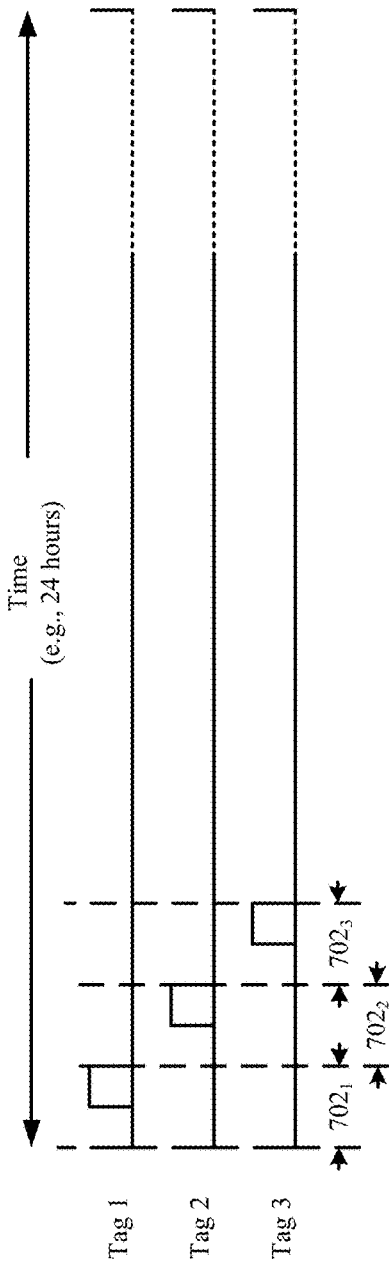

In some scenarios such as that shown in FIG. 7B, a single RFID tag is assigned to each time slot. For example, a first RFID tag is assigned to the first time slot $702_1$. A second RFID tag is assigned to a second time slot $702_2$. A third RFID tag is assigned to a third time slot $702_3$. This time slot assignment can be performed in accordance with a chaotic, random or pseudo-random number algorithm. Alternatively, the time slot assignment can be determined based on the unique codes of the tags (e.g., EPCs, Cyclic Redundancy Check ("CRC") codes, hash codes or outputs of randomizing algorithms). The time slot assignment can be performed by the RFID tags (e.g., RFID tags $112_1, \ldots, 112_N$, $118_1, \ldots, 118_X$ of FIG. 1), tag readers (e.g., tag reader(s) 120 of FIG. 1), and/or a remote server (e.g., server 124 of FIG. 1).

In some scenarios, the time slot allocations can be dynamically changed during system operations. For example, a relatively large number of tag read collisions are occurring in the system (e.g., system 100 of FIG. 1). Accordingly, the time slot allocations are changed so as to minimize such tag read collisions. The manner in which time slots are re-allocated can be determined by a single device (e.g., server 124 of FIG. 1) or by a plurality of devices (e.g., RFID tags 112$_1$, ..., 112$_N$, 118$_1$, ..., 118$_X$, tag readers 120 and/or server 124 of FIG. 1).

Figure 8:
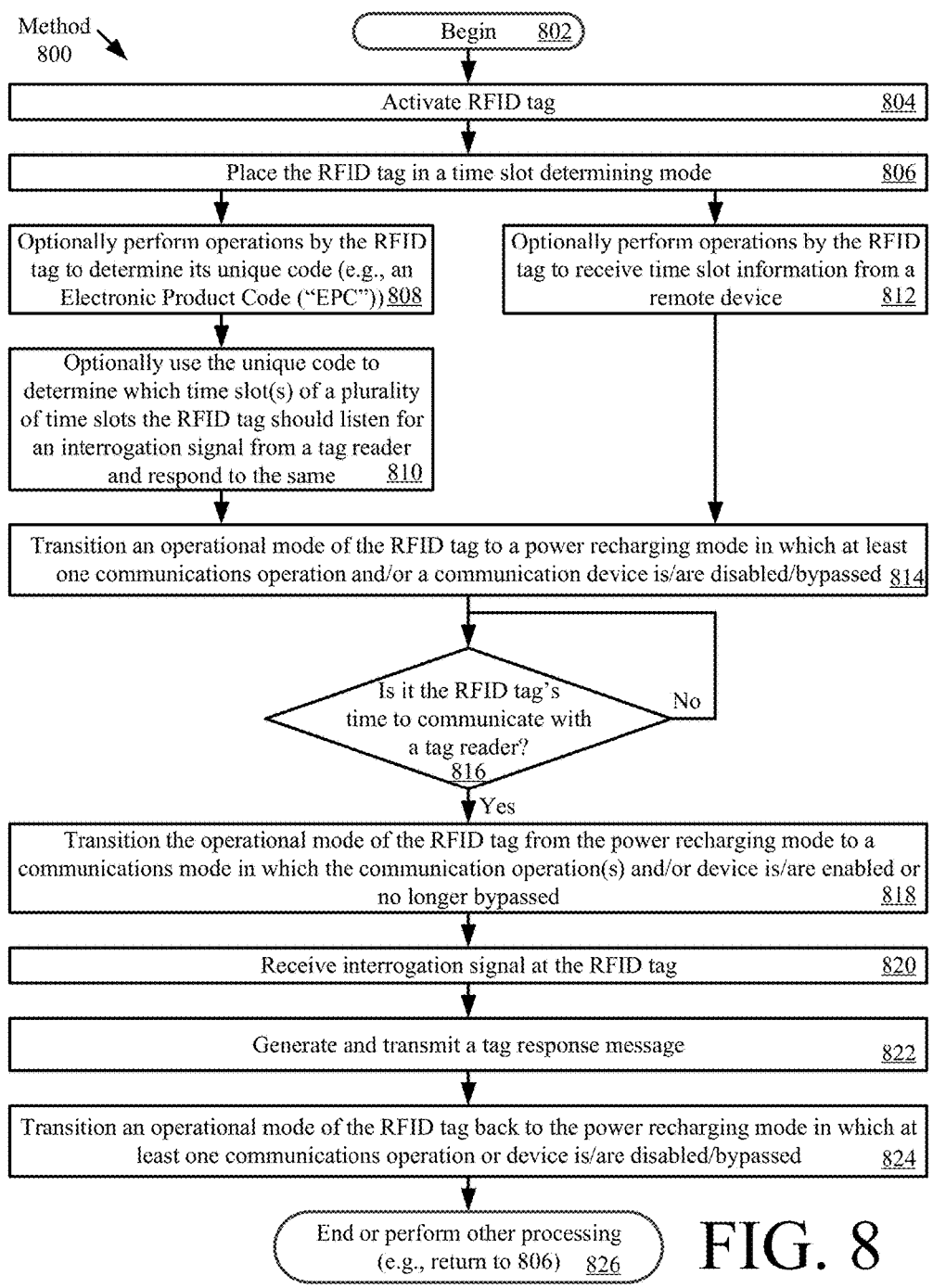
FIG. 8 is a flow diagram of an illustrative method for an inventory cycle count using time slots for communications between tag readers and tags.

Referring now to FIG. 8, there is a flow diagram of an illustrative method 800 for determining an inventory using a time slotted communications scheme such as that shown in FIGS. 7A-7B. Method 800 begins with 802 and continues with 804-806 where an RFID tag (e.g., RFID tags 112$_1$, ..., 112$_N$, 118$_1$, ..., or 118$_X$ of FIG. 1) is activated and placed in a time slot determining mode.

In the time slot determining mode, the RFID tag is assigned to a time slot (e.g., time slot 702$_1$ of FIG. 7) of a plurality of time slots (e.g., time slots 702$_1$, 702$_2$, ..., 702$_Y$ of FIG. 7). This is achieved through (I) operations performed by the RFID tag and/or (II) operations performed by a remote device (e.g., tag reader 120 of FIG. 1 or server 124 of FIG. 1).

In the first case (I), operations 808-810 are performed by the RFID tag. These operations involve: determining the RFID tag's unique code (e.g., unique ID 224 of FIG. 2); and using the unique code to determine which time slot(s) the RFID tag should listen for an interrogation signal from a tag reader and respond to the same. In this regard, the RFID tag can be programed with an algorithm for translating the unique code to a time slot value or with a look-up table indicating a mapping of unique codes to time slot values. The translation can be achieved by using the unique code as an input to a pre-defined algorithm to compute a time slot value.

In the second case (II), operations are performed by the remote device(s). These operations involve: selectively assigning at least one time slot to the RFID tag; and communicating information identifying the selectively assigned time slot(s) to the RFID tag. The time slot assignment can be on a chaotic/random/pseudo-random algorithm and/or in accordance with a unique code-to-time slot translation or mapping scheme. Accordingly, FIG. 8 includes optional block 812 where the RFID tag receives time slot information from a remote device.

Upon completing 810 or 812, method 800 continues with 814 where an operational mode of the RFID tag is transitioned from the time slot determining mode to a power recharging mode. In some scenarios, the operational state or mode change is achieved by changing the binary value of at least one state or mode bit (e.g., from 0 to 1, or vice versa) for causing certain communication control operations to be performed by the RFID tag. Additionally or alternatively, a switch can be actuated for creating a closed or open circuit. The present solution is not limited in this regard.

In the power recharging mode, a rechargeable power source (e.g., power source 236 of FIG. 2) is recharged using energy (e.g., RF energy) harvested by an energy harvesting circuit (e.g., energy harvesting circuit 232 of FIG. 2) of the RFID tag. Notably, at least one communication operation and/or the RFID tag's communication device (e.g., communication device 206 of FIG. 2) is disabled or bypassed in the power recharging mode. Other functions/operations of the RFID tag may also be disabled in this mode for power conservation purposes.

Next, a decision is made as to whether it is time for the RFID tag to communicate with a tag reader. This decision can be achieved using knowledge of the time slot(s) assigned to the particular tag. If it is not the RFID tag's time to communicate with a tag reader [816:NO], then method 800 returns to 816. In contrast, if it is the RFID tag's time to communicate with a tag reader [816:YES], then method 800 continues with 818 where the operational mode of the RFID tag is transitioned from the power recharging mode to a communications mode in which at least one communications operations and/or communication device (e.g., transceiver) is enabled or no longer bypassed. Thereafter in 820, an interrogation signal is received at the RFID tag. Interrogation signals are well known in the art, and therefore will not be described herein. In response to the interrogation signal, the RFID tag generates and transmits a tag response message, as shown by 822. Tag response messages are well known in the art, and therefore will not be described herein. Still, it should be noted that the tag response message can include the RFID tag's unique identifier (e.g., unique identifier 224 of FIG. 2) therein. The present solution is not limited to the particulars of 820-822. For example, a number of iterations of communications operations (e.g., transmit and receive operations) can be performed prior to continuing to 824.

Next in 824, the operational mode of the RFID tag is transitioned back to the power recharging mode in which at least communications operations and/or device (e.g., transceiver) is/are disabled and/or bypassed. Subsequently, 826 is performed where method 800 ends or other processing is performed (e.g., return to 806).

The method 800 described above provides a solution to real time inventory, but does not include a way to detect changes to inventory due to removal of RFID tags from an RSF (e.g., RSF 128 of FIG. 1) between respective adjacent time slots (e.g., because of sale or theft). Accordingly, method 800 can be modified to include additional operations for detecting and accounting for tag movement at all times during an inventorying process. Such a modified method is discussed below in relation to FIGS. 9-13.

Figure 9:
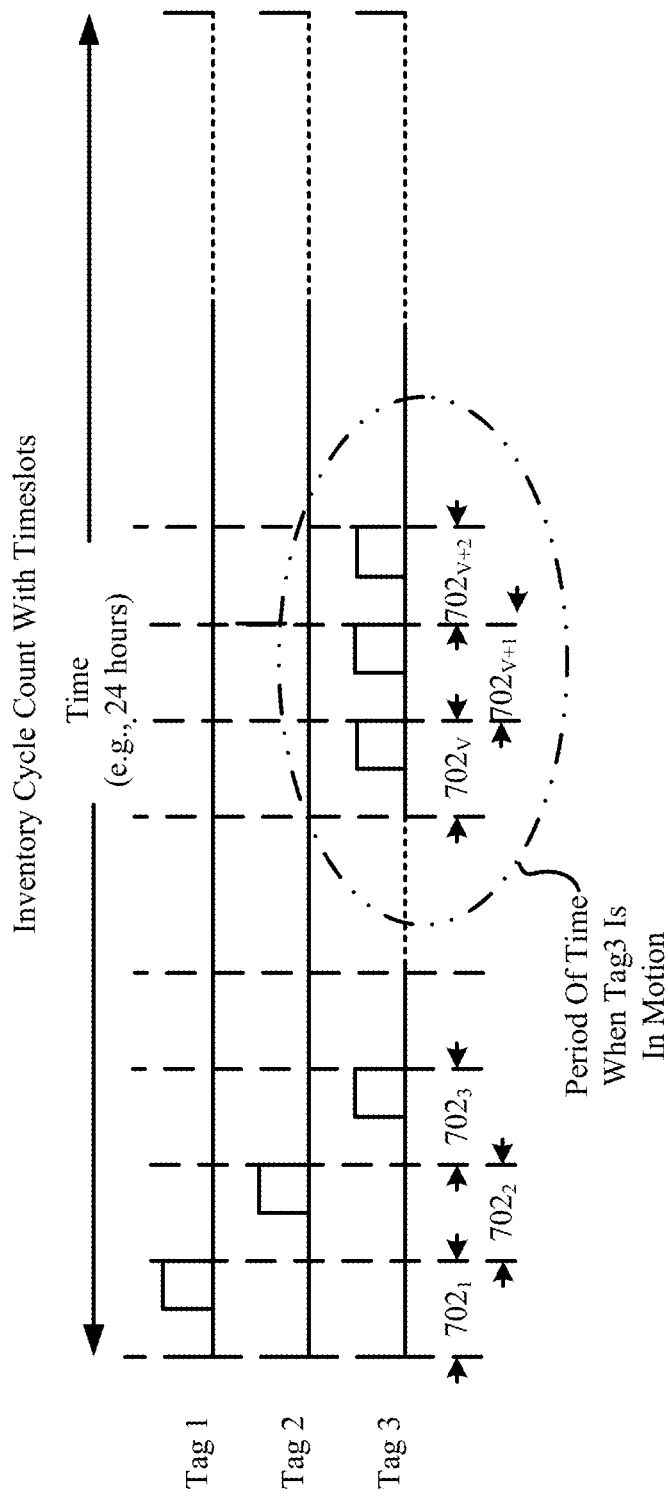
FIG. 9 is an illustration that is useful for understanding an inventory cycle count in which (a) time slots are used for communications between tag readers and tags and (b) a detection of tag motion causes communication enablement.

Referring now to FIG. 9, there is provided an illustration that is useful for understanding methods for determining inventory using motion triggered time slotted tag communications. As shown in FIG. 9, the third tag performs communication (e.g., transceiver) operations in time slots 702$_V$, 702$_{V+1}$, 702$_{V+2}$ in addition to its assigned time slot 702$_3$. These time slots 702$_V$, 702$_{V+1}$, 702$_{V+2}$ occur during a period of time when the third tag is in motion. This allows tag readers to see moving RFID tags quickly, as well as helps at a Point Of Sale ("POS") and to determine whether the RFID tags were moved into a high risk area (e.g., a fitting room or bathroom).

Figure 10:
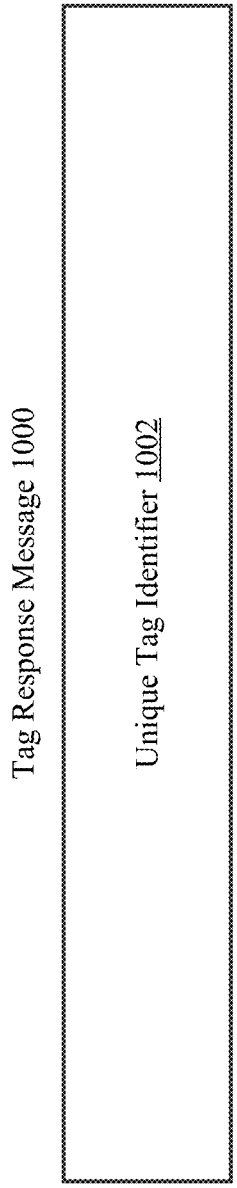
FIG. 10 is an illustration of a tag response message.
Figure 11:
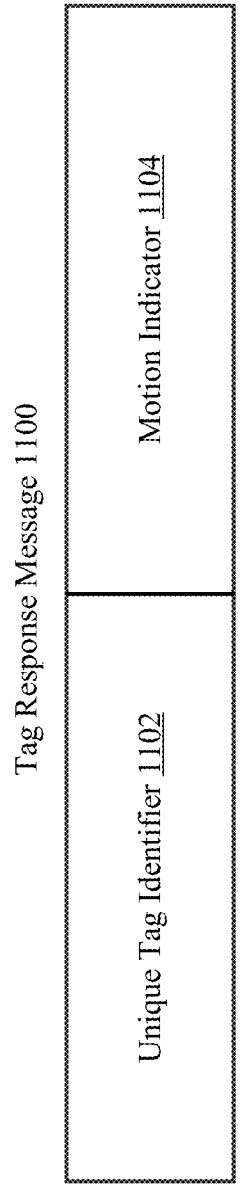
FIG. 11 is an illustration of another tag response message.

Referring now to FIGS. 10-11, there are provided illustrations that are useful in understanding the contents of tag response messages. In some scenarios, the tag response message 1000 includes only a unique tag identifier 1002 (e.g., unique ID 224 of FIG. 2). In other scenarios, the tag response message 1100 includes a motion indicator 1104 in addition to the unique tag identifier 1102. The motion indicator 1104 indicates whether the tag is currently in motion, is in a given operational state/mode, and/or has a given motion sensor state.

Referring now to FIG. 12, there is provided a flow diagram of an illustrative method 1200 for determining inventory using time slotted tag communications. Method 1200 begins with 1202 and continues with 1204-1224. 1204-1224 are the same as or substantially similar to 804-

824 of FIG. 8. The above discussion of 804-824 is sufficient for understanding 1204-1224. Notably, a new block 1217 is provided in which method 800 continues to 1226 of FIG. 12B when a determination is made in 1216 that it is not the RFID tag's time to communicate with the tag reader.

Figure 12A:
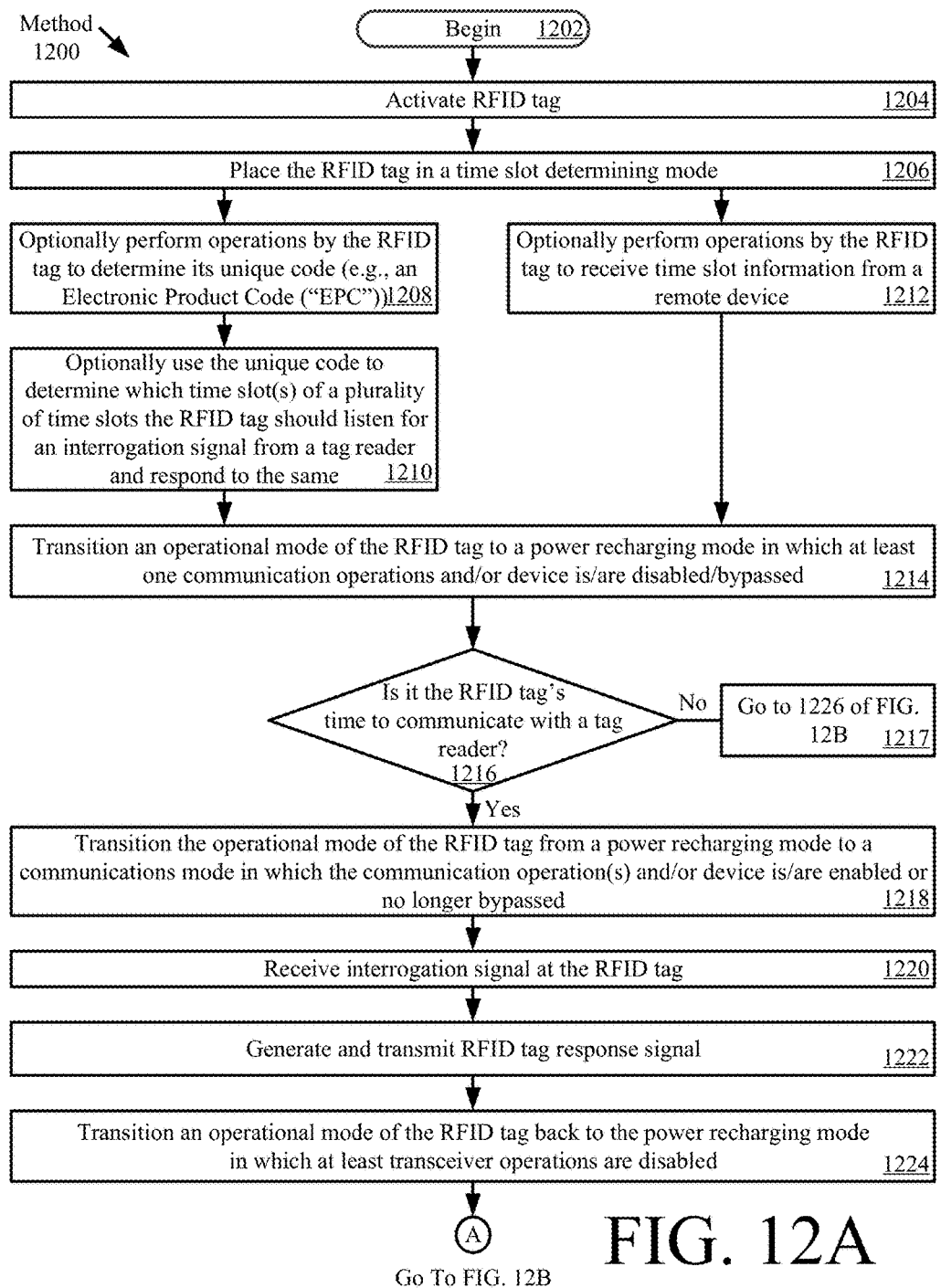
FIGS. 12A-12B (collectively referred to herein as "FIG. 12") provide a flow diagram of an illustrative method for an inventory cycle count.
Figure 12B:
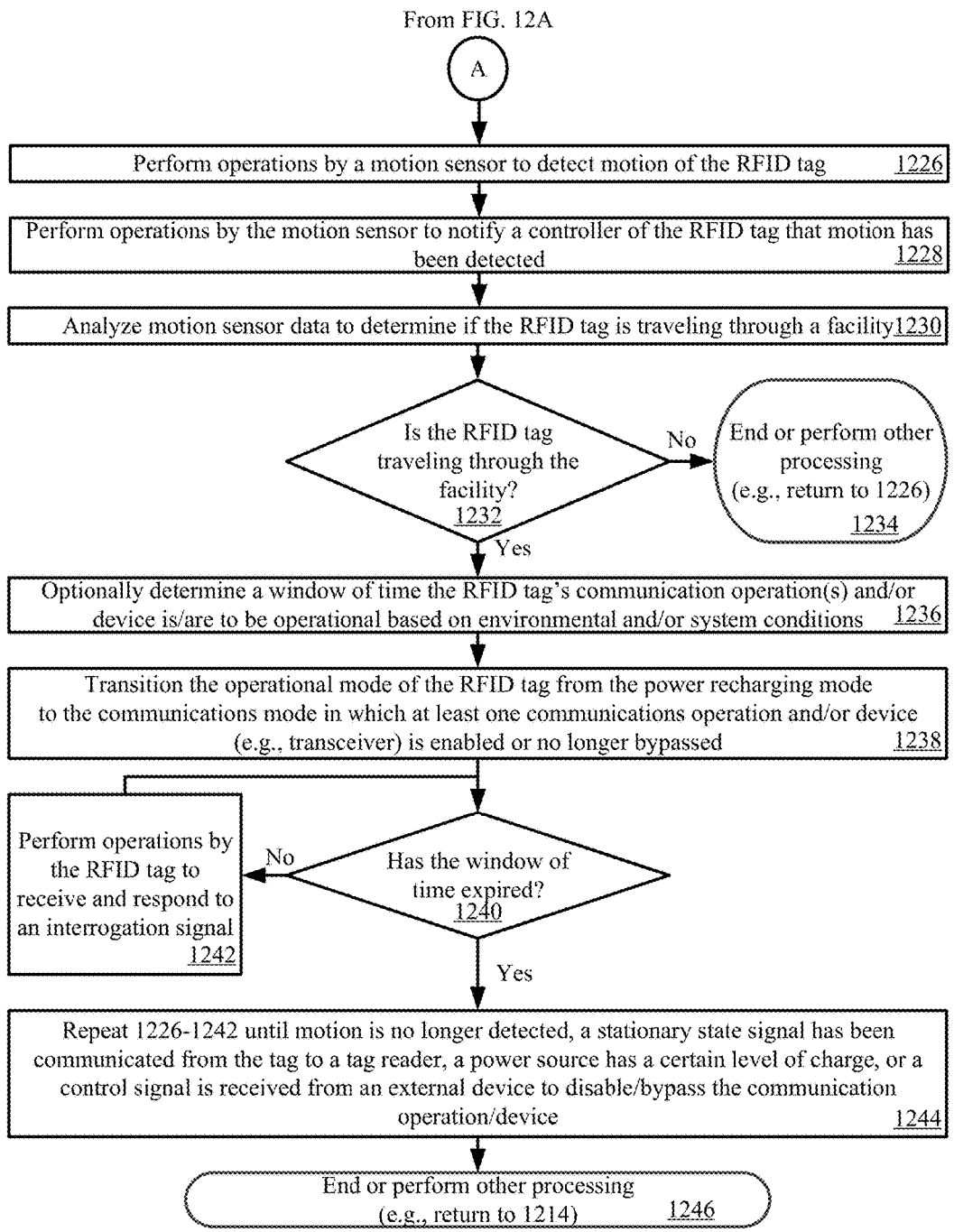

Upon completing 1224, method 1200 continues with 1226 of FIG. 12B. As shown in FIG. 12B, 1226 involves performing operations by a motion sensor (e.g., motion sensor 250 of FIG. 2) to detect motion of the RFID tag (e.g., RFID tag $112_1, \ldots, 112_N, 118_1, \ldots,$ or $118_X$ of FIG. 1). Next in 1228, the motion sensor performs operations to notify a controller (e.g., controller 210 of FIG. 2) of the RFID tag that motion has been detected. The motion sensor also provides motion sensor data to the controller. In 1230, the motion sensor data is analyzed to determine if the RFID tag is traveling through a facility. This analysis can be performed by the RFID tag's controller and/or a remote device (e.g., a tag reader or server). The analysis can involve detecting pre-defined patterns of movement specified in the motion sensor data (e.g., a walking pattern, a running pattern, or a vehicle traveling pattern). If a determination is made that the RFID tag is not traveling through a facility (e.g., RSF 128 of FIG. 1) [1232:NO], then 1234 is performed where method 1200 ends or other processing is performed (e.g., return to 1226).

In contrast, if a determination is made that the RFID tag is traveling through a facility [1232:YES], then 1236 is optionally performed where a WOT is determined during which the RFID tag's communication operation(s) and/or communication device (e.g., transceiver) is to be operational, enabled or no longer bypassed. 1236 is optional since the RFID tag can be pre-programed with a WOT value. In other scenarios, a value for the WOT is determined by the RFID tag and/or a remote device. The WOT value is determined based on environmental conditions and/or system conditions. Notably, the WOT value is variable. This feature of the present solution allows minimization of the RFID tag's system power, minimizes tag read collisions, and identification of moving RFID tags without reading all static/stationary RFID tags.

Once the RFID tag has knowledge of the WOT value, then 1238 is performed where its operational mode is transitioned from the power recharging mode to the communications mode in which at least one communication operation and/or communication device (e.g., transceiver) is enabled or no longer bypassed. In the communications mode, the RFID tag uses an internal clock/timer (e.g., clock/timer 214 of FIG. 1) to determine if the WOT has expired. If not [1240:NO], then the RFID tag performs operations in 1242 to receive and respond to at least one interrogation signal. If so [1240:YES], then 1226-1242 are repeated until motion is no longer detected, a stationary state signal has been communicated from the tag to a tag reader, a power source (e.g., power source 236 of FIG. 2) has a certain level of charge, and/or a control signal is received from an external device to disable or bypass the communication operations and/or device (e.g., transceiver). Subsequently, 1246 is performed where method 1200 ends or other processing is performed (e.g., return to 1214 of FIG. 12A).

The present solution has many advantages. For example, the present solution: solves real time, daily, accurate inventory with a low cost tag reader infrastructure; solves an overhead RFID as EAS problem; is able to accurately track moving tags; identify tags leaving a store even when there are a relatively large number of tags in proximity to the exit; and improves ecommerce processes by providing accurate inventory count and RFID tag locations at all times. The present solution is also greener since it limits the amount of time RF devices are enabled.

The present solution can be used in conjunction with other sensors, such as proximity sensors. For example, if proximity sensors detect the presence of individuals in the facility, then the stationary tag readers can be temporarily disabled (e.g., until there are no more people in the facility).

The RFID tags of the present solution are relatively small with good read range. This allows the RFID tags to be added to animals (e.g., humans, pets, etc.). In this case, the RFID tags can be configured to have enabled communication operations and/or devices (e.g., transceivers) only during times of detected movement thereof. The RFID tags could also be placed on wearable items (e.g., hats, belts, etc.) in a manner that does not interfere with the wearing humans.

Security Tag Detachment or Deactivation

As noted above, the present solution uses a mobile shopping app, shopping website or self-checkout station to enable purchase transactions. The purchase transactions involve the scanning of the UPC or Electronic Product Codes ("EPC") associated with a product. The solution may use multiple tagging technologies in conjunction with each other or a single technology. The security tag protects the product and a secondary tag has a unique product identifier. The secondary tag could be an RFID tag that uniquely identifies the product by including the EPC. The RFID tag may be incorporated into the security tag as a dual technology tag for a single security tag option or as a separate tag on the product. The dual technology security tag may have a barcode identifying the encoded EPC. Alternatively or additionally, the EPC may be encoded in a way where the UPC is included in the EPC.

Figure 15:
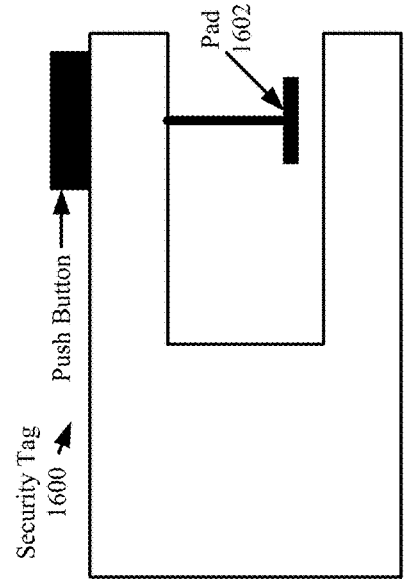
Figure 16:
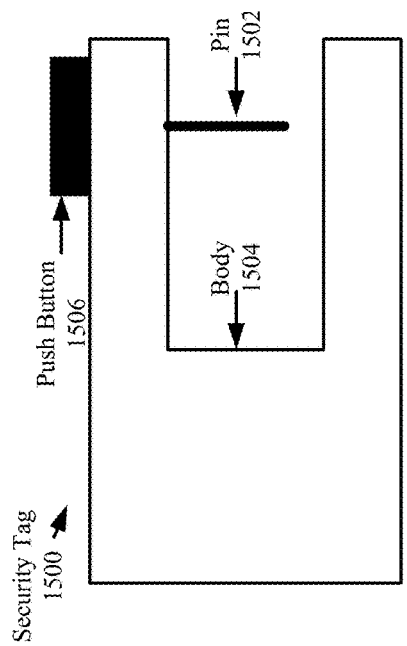

The security tags can include, but are not limited to, pin based tags (e.g., security tag 1500 shown in FIG. 15, security tag 1700 shown in FIG. 17, and/or security tag 1900 shown in FIG. 19), pad based tags (e.g., security tag 1600 shown in FIG. 16, security tag 1800 shown in FIG. 18, and/or security tag 2000 shown in FIG. 20), and/or pin less tags (e.g., security tag 2100 shown in FIG. 21). The security tags are designed to be easily detached, relatively inexpensive, and are each a single unit.

Figure 17:
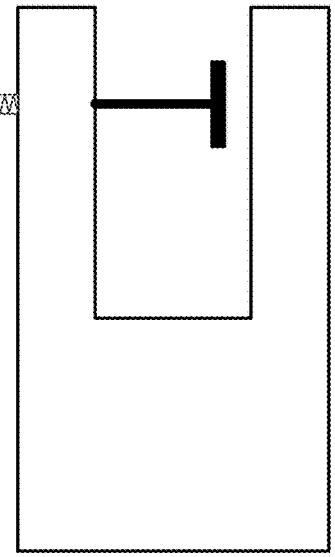
Figure 18:
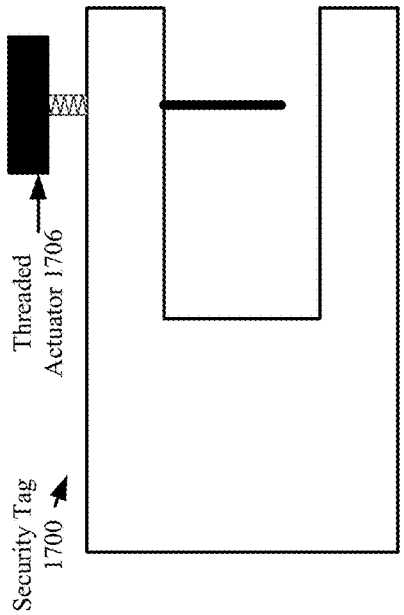

The pin based tags 1500, 1700, 1900 can be implemented with push buttons 1506, 1906 having two states similar to a pen (i.e., a first state in which a pin 1502 is extended out of a tag body 1504 and a second state in which the pin 1502 is withdrawn into the tag body 1504). A disable toggle switch 1902 may be provided to disable operations of the push button. Toggle switches are well known in the art, and therefore will not be described in detail herein. Any known or to be known toggle switch can be used herein without limitation. The disable toggle switch 1902 can be manually controlled or electronically controlled (e.g., via a motor and a rotatable lever arm 1908 that can stop a downward motion of the push button). The push buttons can be replaced with threaded actuators 1706 as shown in FIG. 17. The pad based tags 1600, 1800, 2000 are similar to the pin based tags except that a pad 1602 is provided at the free end of the pin. The pad 1602 may have groves, protrusions or indents formed thereon for gripping an object.

In some scenarios, the security tag is provided with an actuator that is designed to have two modes of operation, namely a first mode of operation in which the actuator acts as a rotary knob and a second mode of operation in which the actuator acts as a push button. An illustrative security tag 2200 with this design is provided in FIG. 22. This tag design makes it difficult for children to detach the security tag 2200 from an object. In this regard, it should be understood that the clockwise or counter clockwise rotation of an actuator 2202 enables a button depression feature. If the button depression feature of the actuator 2202 is disabled, then depression thereof causes the same to contact a stop mechanism 2204 that is in its protruding positon so as to prevent movement thereof in downward direction 2206. If the button depression feature is enabled, then the stop mechanism 2204 is in its retracted positon in which it no longer prevents downward movement of the actuator 2202.

Figure 22:
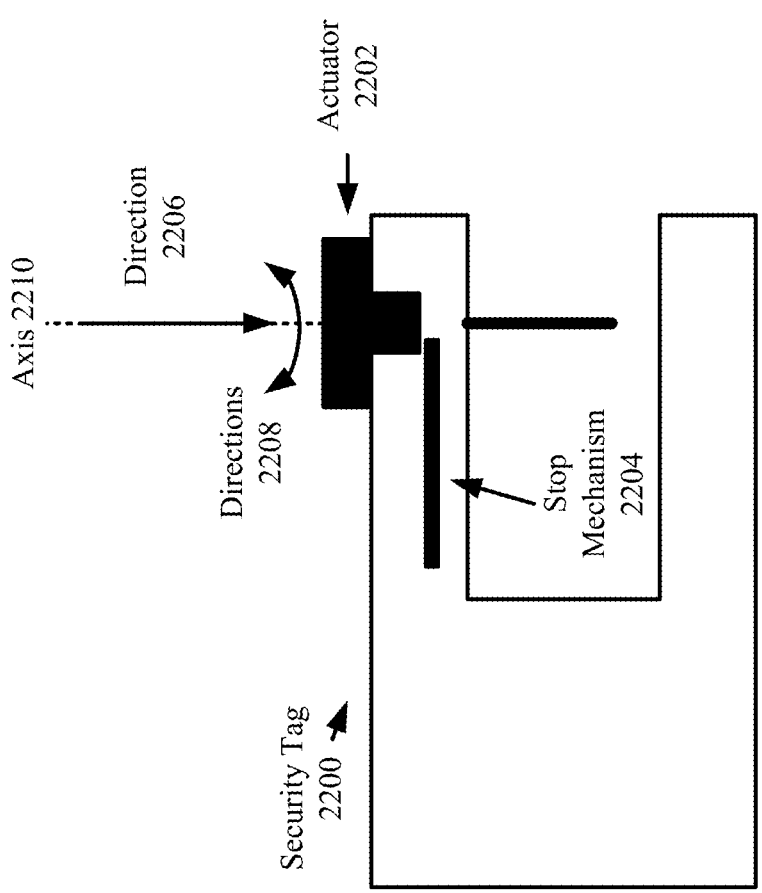
FIG. 22 provides an illustration of an illustrative security tag architecture.

The tag design of FIG. 22 also provides additional security features to the tag. In this regard, it should be understood that a level 1 security protocol is initiated when the actuator 2202 is rotated in a direction 2208 at a time when the object (to which it is coupled) has not been successfully purchased. In response to the level 1 security protocol initialization, the security tag 2200 outputs an alarm (e.g., auditory, visual and/or tactile alarm), sets a bit to a value indicating that a detachment attempt was made, and/or communicates a signal to an enterprise system device for notifying store personnel. The alarming can be disabled by rotating the actuator 2202 from its rotated positon back into its original non-rotated position. The alarming will continue if the actuator 2202 is thereafter depressed. When the actuator 2202 is in its depressed position, the security tag level 2 security protocol is initialized. The level 2 security protocol requires special operations to be performed by store personnel for resetting the security tag's operational mode back into its normal operational mode (i.e., a simple return of the actuator 2202 to its original non-rotated/undepressed position will not transition the tag from a security protocol mode to a normal operational mode).

The pin less tags can be implemented as spring loaded tags or tags that are detached by breaking a string. An illustration of an illustrative spring loaded tag 2100 is shown in FIG. 21. The spring loaded tag 2100 operates in a manner similar to an alligator clip such that a spring 2102 facilitates the holding of an object in a grip area 2104.

Cryptography may be employed to provide secure communications between the security tags and other devices (such as mobile devices and an enterprise system). Cryptographic techniques are well known in the art, and therefore will not be described herein in detail. Any known or to be known cryptographic technique can be used herein without limitation. For example, in some scenarios, an encryption technique is employed that requires a challenge/response where the security tag generates a pseudo-random number and combines the same with a unique identifier. The encrypted unique identifier is then sent to the cloud through a mobile device (e.g., a smart phone) where a response from a proper authority is returned for validation within the security tag. In a symmetric key system, the device unique key is used to generate the pseudo-random number. In a public/private key system, the private key is used to generate the pseudo-random number and the public key is stored in the security tag. For low cost CPUs, symmetric keys may be used to preserve power and consumption time at the tag. Either method results in a unique, validated response from the cloud to the security tag. The present solution is not limited to the particulars of the above described example and key based scenarios.

The security model for most tags today depends on the assumption that a special tool is needed to remove the tags. However, these tools are accessible to the general public. Therefore, relying on this security only stops the honest people. If the security tags are designed to have more intelligence and are used with other security means (e.g., cameras, security personnel, and/or artificial intelligence), then a better overall level of security is provided. Additional benefits are provided if the security tags are also designed to be easily removed by the customers. Restrictions may be provided with regard to where the security tags can be detached or deactivated by customers. For example, a person can detach a security tag from an item only when present in a given area of a retail store which comprises RFID readers, cameras and collection bins for detached security tags. The present solution is not limited to the particulars of this example.

The present solution: allows a customer to purchase a product using a mobile device (e.g., a smart phone); provides a customer with a way to detach a security tag using the mobile device or to mark the security tag as being attached to a sold item; eliminates the need for a separate pin that creates a hole in the item; and eliminates the need for a special tool to detach the security tags from items.

The present solution is at least partially achieved by: providing a self-detaching tag; providing a pin less security tag; including a Central Processing Unit ("CPU") with energy harvesting in the security tag that is configured to control a near field data path; including a barcode along with the security tag which can be read by a mobile device; including secure RFID communication capabilities with the security tag; and/or providing a method to mark the security tag as being associated with a sold item.

Figure 13:
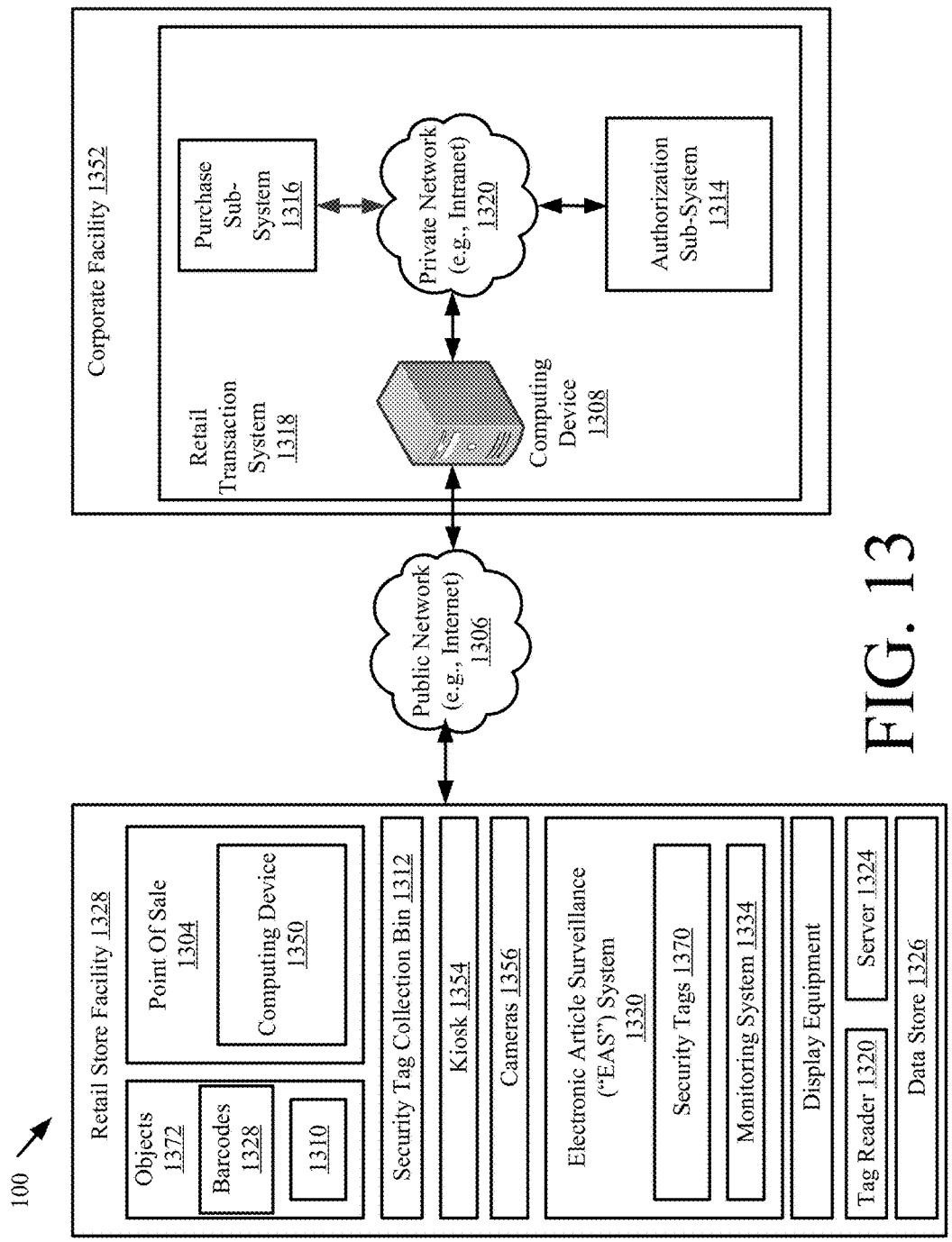
FIG. 13 is an illustration of an illustrative system.

Referring now to FIG. 13, there is provided an illustration of system 1300. System 1300 comprises an EAS system 1330 disposed in the retail store facility 1328. Retail store facility 1328 can comprise retail store facility 128 described above in relation to FIG. 1. The EAS system 1330 comprises a monitoring system 1334 and security tags 1370. The security tags 1370 can include one or more types of security tags. For example, the security tags include, but are not limited to, the security tags 112, 118 described above in relation to FIGS. 1-12B and/or other security tags (e.g., EAS security tags and/or dual technology EAS/RFID security tags that do not employ time slotting as described above). Although not shown in FIG. 13, the security tags 1370 are respectively attached to objects 1372 (which may include objects 110, 116 of FIG. 1), thereby protecting the objects from an unauthorized removal from the retail store facility 1328.

The monitoring system 1334 establishes a surveillance zone (not shown) within which the presence of the security tags 1370 can be detected. The surveillance zone is established at an access point (not shown) for the retail store facility 1328. If a security tag is carried into the surveillance zone, then an alarm is triggered to indicate a possible unauthorized removal of the object 1372 from the retail store facility 1328.

During store hours, a customer (not shown) may desire to purchase the object(s). The customer can purchase the object(s) using a Point Of Sale ("POS") 1304. The POS 1304 can include, but is not limited to, a self-checkout POS station, a Mobile POS ("MPOS") station, or a MPOS device. In all scenarios, a retail transaction application executing on a computing device 1350 of the POS 1304 facilitates the exchange of data between the objects 1372, security tags 1370, customer, and/or Retail Transaction System ("RTS") 1318 of a corporate facility 1352. For example, after the retail transaction application is launched, the customer is prompted to start a retail transaction process for purchasing the objects. The retail transaction process can be started simply by performing a user software interaction, such as depressing a key on a keypad of the computing device 1350 or touching a button on a touch screen display of the computing device 1350.

In the MPOS scenarios, the computing device 1350 comprises a handheld communication device running the retail transaction application. The handheld communication device includes, but is not limited to, a cellular phone, a smart phone, a portable computer, a tablet, or a personal digital assistant. In some scenarios, the retail transaction application performs a check at the time of installation on the computing device 1350. The check is performed to confirm that the computing device 1350 has an NFC capability and that this capability is enabled. If the computing device 1350 does not have an NFC capability, then the user is notified of this fact. The user may also be provided with information as to how to make the computing device 1350 NFC enabled, and/or what versions of the computing device 1350 are NFC enabled. If the NFC capability is not enabled, then the user of the computing device 1350 is notified of this fact and instructed to enable the same. The retail transaction application allows the user to input payment information and set personal preferences.

Subsequently, the retail transaction application can optionally communicate with the RTS 1318 to obtain information relating to sales and/or promotions being offered by the RSF 128. This information is then displayed on a display screen of the computing device 1350.

When the customer is ready to purchase an item, the customer may manually input into the retail transaction application object information. Alternatively or additionally, the customer may place the computing device 1350 of the POS 1304 in proximity of the object, or vice versa. As a result of this placement, the POS 104 obtains object information from the object. The object information includes any information that is useful for purchasing the object, such as an object identifier and an object purchase price. In some scenarios, the object information may even include an identifier of the security tag attached thereto. The object information can be communicated from the object to the computing device 1350 of the POS 1304 via a wireless communication, such as a barcode communication, RFID communication, or an NFC.

In the barcode scenario, the object 1372 has a barcode 1328 attached to an exposed surface thereof. The term "barcode", as used herein, refers to a pattern or symbol that contains embedded data. Barcodes may include, for example, one-dimensional barcodes, two dimensional barcodes (such as matrix codes, Quick Response ("QR") codes, Aztec codes and the like), or three-dimensional bar codes. The embedded data can include, but is not limited to, a unique identifier of the object and/or a purchase price of the object. The barcode 128 is read by a barcode scanner/reader (not shown in FIG. 1) of the POS 1304. Barcode scanners/readers are well known in the art. Any known or to be known barcode scanner/reader can be used herein without limitation.

In the RFID scenarios, the object information is obtained from the security tag 1370. If the security tag 1370 comprises a time slot based security tag 112, 118, then the security tag is able to respond to signals from the POS 1304 since its communications operations were enabled as a result of detected motion thereof, and the current time is still within the selected WOT.

In the NFC scenarios, the object 1372 may comprise an NFC enabled device 1310. The NFC enabled device 1310 can be separate from the security tag or comprise the security tag. An NFC communication occurs between the NFC enabled device 1310 and the computing device 1350 over a relatively small distance (e.g., N centimeters or N inches, where N is an integer such as twelve). The NFC communication may be established by touching components 1372, 1350 together or bringing them in close proximity such that an inductive coupling occurs between inductive circuits thereof. In some scenarios, the NFC operates at 13.56 MHz and at rates ranging from 106 kbit/s to 848 kbit/s. The NFC may be achieved using NFC transceivers configured to enable contactless communication at 13.56 MHz. NFC transceivers are well known in the art, and therefore will not be described in detail herein. Any known or to be known NFC transceivers can be used herein without limitation.

After the POS 1304 obtains the object information, payment information is input into the retail transaction application of POS 1304. The payment information can include, but is not limited to, a customer loyalty code, payment card information, and/or payment account information. The payment information can be input manually, via an electronic card reader (e.g., a magnetic strip card reader), or via a barcode reader. Electronic card readers and barcode readers are well known in the art, and therefore will not be described herein. Any known or to be known electronic card reader and/or barcode reader can be used herein without limitation. The payment information can alternatively or additionally be obtained from a remote data store based on a customer identifier or account identifier. In this case, the payment information can be retrieved from stored data associated with a previous sale of an article to the customer.

Upon obtaining the payment information, the POS 1304 automatically performs operations for establishing a retail transaction session with the RTS 1318. The retail transaction session can involve: communicating the object information and payment information from the POS 1304 to the RTS 1318 via a public network 1306 (e.g., the Internet); completing a purchase transaction by the RTS 1318; and communicating a response message from the RTS 1318 to the POS 1304 indicating that the object has been successfully or unsuccessfully purchased. The purchase transaction can involve using an authorized payment system, such as a bank Automatic Clearing House ("ACH") payment system, a credit/debit card authorization system, or a third party system (e.g., PayPal®, SolidTrust Pay® or Google Wallet®).

The purchase transaction can be completed by the RTS 1318 using the object information and payment information. In this regard, such information may be received by a computing device 1308 of the RTS 1318 and forwarded thereby to a sub-system of a private network 1320 (e.g., an Intranet). For example, the object information and purchase information can also be forwarded to and processed by a purchase sub-system 1316 to complete a purchase transaction. When the purchase transaction is completed, a message is generated and sent to the POS 1304 indicating whether the object has been successfully or unsuccessfully purchased.

If the object has been successfully purchased, then a security tag detaching/deactivation process can be started automatically by the RTS 1318 or by the POS 1304. Alternatively, the user (not shown in FIG. 13) can start the security tag detaching/deactivation process by performing a user-software interaction using the POS 1304. In all three scenarios, the object information can optionally be forwarded to and processed by an authorization sub-system 1314 to generate one or more Tag Deactivate/Detach ("TDD") authorization codes that are useful for ensuring that security tags are only detached from or deactivated when attached to successfully purchased articles. Each TDD authorization code is generated using (a) the unique identifier of the security tag associated with an article which has been successfully purchased and (b) a cryptographic key assigned to the security tag. The TDD authorization code comprises the unique identifier signed using the cryptographic key. Methods for signing information using keys are well known in the art, and therefore will not be described herein. Any known or to be known method for signing data can be used herein without limitation. The TDD authorization code is then sent from the authorization sub-system 1314 to the POS 1304. At the POS 1304, the TDD authorization code's signature is decrypted, read and validated. Once validated, the POS 1304 causes a bit to be set in the security tag indicating that it is associated with a successfully purchased object. The POS 1304 also stores information in the data store 1326 (which can comprise data store 126 of FIG. 1) indicating that the security tag is associated with a successfully purchased object.

Once the security tag has knowledge that it is associated with a successfully purchased object, the security tag performs the following operations: entering an operational mode in which a user is allowed to remove the security tag from the object without alarm issuance (e.g., the alarm is disabled or bypassed); and/or initiating self-detachment operations so that the security tag can be removed from the object relatively easily. The self-detachment operations generally involve causing the security tag to actuate a detaching mechanism (e.g., a motor or a switch 242 of FIG. 2). For example, operations are performed to (a) cause a mechanical component to no longer prevent downward movement of a push button and/or (b) cause a pin to be retracted such that the security tag can be removed from the object 1372. Once the security tag has been removed from the object, the customer can carry the object through the surveillance zone without setting off the alarm.

In some scenarios, the security tag 1370 comprises a spring loaded tag that connects to the object with pressure. An electrical connection is made by a pin inserted through the object or no longer in contact with the object. A break in or creation of the electrical connection causes a notification and/or other information to be communicated to the server 1324 (which may include server 124 of FIG. 1) indicating that the security tag has been removed from the object. The pin may operate similar to a pen (e.g., every time it is clicked it stays in an extend position or in a withdrawn position). In other scenarios, the security tag 1370 comprises a plastic loop or conductive loop facilitating its attachment/detachment from the object. An electrical connection is made when a free end of the loop is secured to the main body of the security tag. When this electrical connection is broken, the server is notified thereof.

The tag deactivation operations are generally configured to cause an RFID and/or EAS device of the security tag to be deactivated. In this regard, a deactivate command is communicated from the security tag's controller 210 to the RFID and/or EAS component (e.g., EAS component 244 of FIG. 2) of the security tag. The RFID and/or EAS component authenticates the deactivate command and deactivates itself. Once the RFID and/or EAS device has been deactivated, the server is notified thereof (i.e., that the security tag can no longer response to interrogation signals). Also, the customer can carry the object through the surveillance zone without setting off the alarm.

The POS 1304 and/or server 1324 performs operations to verify that the security tag is the security tag authorized to be removed from a given object. This verification can be made prior to or subsequent to the tags detachment from the object. This verification is made based on: purchase transaction information; a security tag identifier; an object identifier; timestamped information indicating that the security tag has been removed from a given object; intelligence information specifying the security tags motion during a given period of time; the security tags and/or objects last known location(s); and historical information about the security tag's use, locations in and/or paths of travel through the RSF 1328. If such verification is not made, then the security tag is caused to issue an alarm (visual, auditory and/or tactile), and/or transition to a battery assisted mode to increase a read range. Alternatively or additionally, the POS 1304 outputs an alarm (visual, auditory and/or tactile), and/or store personnel is notified of the unauthorized tag removal. Cameras 1356 and other security equipment can be employed to correlate a time, place and person associated with the unauthorized tag removal. If such verification is made, then the POS 1304 outputs instructions to the user to place the security tag in a collection bin 1312. Notably, the security tags are re-usable, and therefore can be reprogrammed and attached to other objects.

In some scenarios, a kiosk 1354 can be employed to facilitate the detachment of the security tags from the objects. For example, a customer carries the already purchased objects to the kiosk 1354, and initiates a security tag detachment/disablement process. The kiosk 1354 comprises a tag reader 1320 (which can comprise tag reader 120 of FIG. 1). The tag reader 1320 communicates with the security tags to inform them that they are now in a location at which they can be removed from the objects. In response to this information, the security tags perform self-detachment or self-deactivation operations.

Figure 14A:
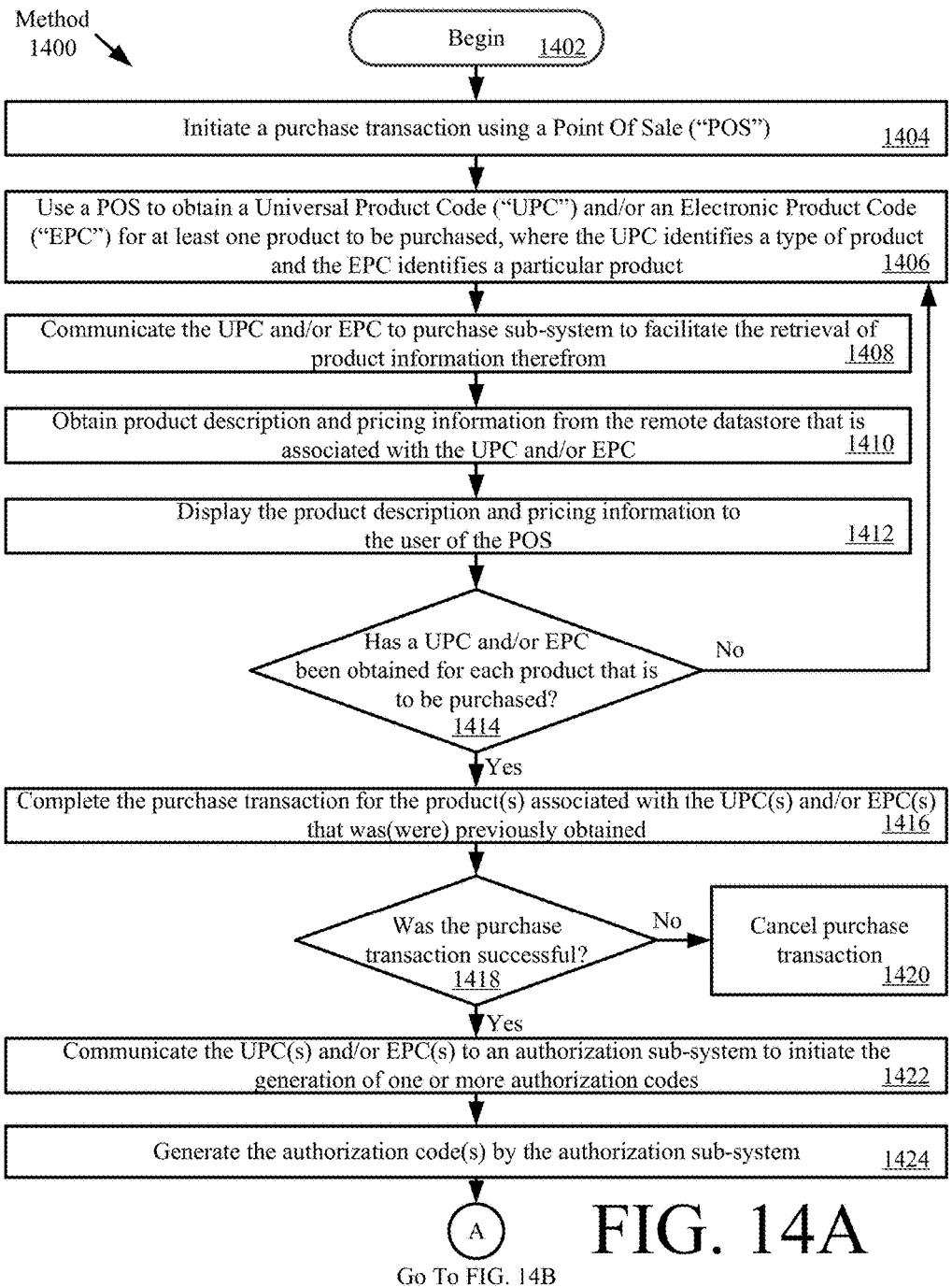

Referring now to FIGS. 14A-14C, there is provided a flow diagram of an exemplary method 1400 for security tag detachment or deactivation. Method 1400 provides a methodology to allow a consumer to remove a security tag from an article (or object) that has been successfully purchased. Currently, there is no process for allowing the customer to detach security tags from products that (s)he has successfully purchased.

As shown in FIG. 14A, method 1400 begins with step 1402 and continues with step 1404 where a purchase transaction is initiated using a POS (e.g., POS 1304 of FIG. 13). Techniques for initiating such a purchase transaction are well known in the art, and therefore will not be described herein. After completing step 1304, step 1306 is performed where the POS is used to obtain a UPC and/or an EPC for at least one product to be purchased. The UPC uniquely identifies a type of product. The EPC uniquely identifies a particular product. The UPC and/or EPC can be obtained using one or more scanning technologies. The scanning technologies include, but are not limited to, RFID technology, NFC technology and/or barcode technology. In some scenarios, the UPC and/or EPC is obtained from the security tag (e.g., security tag 1370 of FIG. 13). If the security tag is a time slot based security tag (e.g., tag 112 or 118 of FIG. 1), then the communications operations thereof are enabled or no longer being bypassed (responsive to detected motion thereof) such that the tag can respond to messages received thereat from the POS.

The UPC and/or EPC is then communicated to a purchase sub-system (e.g., purchase sub-system 1316 of FIG. 13) to facilitate the retrieval of product information therefrom, as shown by step 1408. In this regard, the purchase sub-system may comprise or have access to a remote datastore in which product information was pre-stored. The product information includes, but is not limited to, product descriptions and purchase prices. The purchase sub-system then uses the UPC and/or EPC to obtain any associated product description and pricing information from the remote datastore, as shown by step 1410. The product description and pricing information is communicated in step 1412 to the POS so that it can be displayed to the user thereof.

At this time, a decision 1414 is made as to whether a UPC and/or EPC has(have) been obtained for each product that is to be purchased. If a UPC and/or EPC has(have) not been obtained for each product that is to be purchased [1414:NO], then method 1400 returns to 1406. In contrast, if the UPC and/or EPC has(have) been obtained for each product that is to be purchased [1414:YES], method 1400 continues with 1416. 1416 involves completing the purchase transaction for the product(s) associated with the UPC(s) and/or EPC(s) previously obtained. If the purchase transaction was not successful [1418:NO], then 1420 is performed where the purchase transaction is canceled. If the purchase transaction was successful [1418:YES], then 1422 is performed for starting a security tag detachment/deactivation process.

1422 involves communicating the UPC(s) and/or EPC(s) from the POS to an authorization sub-system (e.g., authorization sub-system 1314 of FIG. 13). In some scenarios, only the UPCs are obtained from the articles to be purchased. In this case, the authorization sub-system will perform actions to identify the particular products that have been purchased using the UPC(s). For example, a look-up table can be used for this purpose. This step is performed so that the authorization sub-system has knowledge of the particular articles which (a) have been successfully purchased and (b) have security tags that need to be deactivated or detached therefrom.

Once the UPC(s) and/or EPC(s) have been received by the authorization sub-system, 1424 is performed where the authorization sub-system generates a Purchase Transaction Session ("PTS") authorization code and/or a TDD authorization code for each purchased item. The PTS authorization code is generated so as to provide a means for subsequently obtaining a list of TDD authorization codes for items that were successfully purchased during a particular purchase session. The PTS authorization code can include, but is not limited to, a numeric sequence, an alphanumeric sequence, or an alphabetic sequence that uniquely identifies a single purchase transaction process.

The TDD authorization code is generated so as to provide a means for subsequently authorizing the detachment or deactivation of security tags attached only to the previously purchased articles. The TDD authorization code includes, but is not limited to, a numeric sequence, an alphanumeric sequence, or an alphabetic sequence that uniquely identifies a single security tag detachment/deactivation process. The TDD authorization code is generated using a cryptographic key. The cryptographic key is generated using a chaotic, random or pseudo-random algorithm. Chaotic, random or pseudo-random algorithms are well known in the art, and therefore will not be described herein. Any known or to be known chaotic, random or pseudo-random algorithm can be used herein without limitation. In this regard, the TDD authorization code may be a single use code which is generated using a one-time use cryptographic key.

Upon completing 1424, method 1400 continues with 1426 of FIG. 14B. As shown in FIG. 14B, 1426 involves communicating the PTS authorization code and/or TDD authorization code(s) from the authorization sub-system to the POS, a tag reader (e.g., tag reader 1320 of FIG. 13), or a kiosk (e.g., kiosk 1354 of FIG. 13). Next in optional 1428, a notification is output from the POS, tag reader or kiosk.

The notification indicates that the authorization code(s) has(have) been successfully received and/or that the user should now proceed to the area of the facility (e.g., retail store facility 1328 of FIG. 13) which contains a security tag collection bin (e.g., security tag collection bin 1312 of FIG. 13), tag reader (e.g., tag reader 1320 of FIG. 13), camera (e.g., camera 1356 of FIG. 13), and/or kiosk (e.g, kiosk 1354 of FIG. 13) if (s)he is not already at the same. In response to the notification, the user optionally proceeds to the area, as shown by 1430.

In a next 1432, the PTS authorization code is communicated from the POS to the tag reader or kiosk. In turn, the PTS authorization code is communicated from the tag reader or kiosk to the authorization sub-system, as shown by 1434. At the authorization sub-system, the PTS authorization code is used in 1436 to obtain one or more TDD authorization codes associated with items that were successfully purchased during the particular session. Each TDD authorization code includes a security tag identifier signed using a respective cryptographic key. Notably, the security tags have different cryptographic keys assigned thereto. Therefore, a different cryptographic key is used to sign each security tag identifier. In some scenarios, a security tag identifier is signed by combining the same with the respective cryptographic key (which can include, but is not limited to, a chaotic number, a random number, or a pseudo-random number). The signed security tag identifiers are those for the security tags associated with the articles (a) that were successfully purchased by the user and (b) which need to have their security tags detached/deactivated. The signed security tag identifiers can be pre-generated prior to 1432 or generated in response to the PTS authorization code's reception by the authorization sub-system.

The TDD authorization codes (or signed security tag identifier(s)) is(are) then communicated to the POS, tag reader or kiosk in 1438. In 1440, the TDD authorization codes (or signed security tag identifier(s)) is(are) communicated to the respective security tag(s). In response to a signed security tag identifier, the security tag performs operations in 1442 to determine if the unique identifier in the TDD code matches an internally stored identifier. If so, the security tag performs operations to verify the signature of the TDD authorization code (i.e., that the TDD code came from a given source). Upon verification of the signature, the security tag sets a status bit to a value (e.g., a "1" value or a "0" value) indicating that it is coupled to an article that no longer constitutes inventory to be sold or loaned. Once the status bit value is set, operations are performed by the security tag in 1444 that involve: withdrawing a pin (e.g., pin 1502 of FIG. 15) or pad (e.g., pad 1602 of FIG. 15); actuating a mechanical component (e.g., lever arm 1908 of FIG. 19) to allow downward motion of a push button (e.g. push button 1506 of FIG. 15); and/or temporarily disabling alarming functions (e.g., visual, auditory or tactile alarming features). Upon completing 1444, method 1400 continues with 1446 of FIG. 14C.

As shown in FIG. 14C, 1446 involves optionally performing operations by an enterprise system (e.g., server 1324 and/or computing device 1308 of FIG. 13) to verify that the security tag was removed from the article based on (a) images captured by at least one camera (e.g., camera 1356 of FIG. 13), (b) a signal received from the security tag indicating that it has been detached from the object, and/or (c) system intelligence of the security tag's motion, path of travel through a facility, and last known location in the facility. In some scenarios, the system intelligence is acquired using information obtained from moving tags as described above in relation to FIGS. 1-12B (i.e., using information received from the security tag during time slots of a plurality of time slots that are allocated to other security tags, when the security tag is in motion).

If authorization of the security tags detachment was not verified [1448:NO], then 1450 is performed where an alarm is output from the security tag, tag reader and/or kiosk. Store personnel may also be notified. Thereafter, 1458 is performed where method 1400 ends or other processing is performed.

If authorization of the security tags detachment was verified [1448:YES], then 1452 is performed where the user is optionally presented with a request to place the security tag in the collection bin. Next in 1454, a decision is made as to whether the security tags for all articles have been detached. If not, method 1400 returns to 1440 of FIG. 14B as shown by 1456. If so, method 1400 ends or other processing is performed as shown by 1458.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a security tag, comprising:
receiving, by the security tag from an external device, an authorization code comprising a security tag identifier, where the security tag identifier is signed using a cryptographic key of a plurality of cryptographic keys that are respectively assigned to a plurality of security tags;
performing operations by the security tag to verify a signature of the authorization code; and
responsive to the verification of the authorization code's signature, performing detach operations or deactivation operations by the security tag which received the authorization code, where the detach operations cause a mechanical detachment of the security tag from an item and the deactivation operations cause a disablement of a response by the security tag to an interrogation signal from a Radio Frequency Identification ("RFID") system or an Electronic Article Surveillance ("EAS") system.

2. The method according to claim 1, wherein the authorization code is received by the security tag from a Point Of Sale ("POS") terminal.

3. The method according to claim 1, wherein at least one of the detach operations and the deactivation operations comprise setting a status bit to a value indicating that the security tag is coupled to an article that no longer constitutes inventory to be sold or loaned.

4. The method according to claim 3, wherein the detach operations further comprise withdrawing a pin of the security tag, withdrawing a pad of the security tag, or actuating a first mechanical component of the security tag to allow motion of a second mechanical component of the security tag.

5. The method according to claim 1, further comprising performing operations by the security tag to notify an enterprise system of the security tag's mechanical detachment from an item or the disablement of the security tag's ability to respond to the interrogation signal.

6. The method according to claim 5, further comprising performing operations by the enterprise system to verify that the security tag was actually removed from the article.

7. The method according to claim 6, wherein the security tag's removal is verified based on contents of captured images.

8. The method according to claim 6, wherein the security tag's removal is verified based on system intelligence of the security tag's motion, the security tag's path of travel through a facility, and the security tag's last known location within the facility.

9. The method according to claim 8, wherein the system intelligence is obtained using information received from the security tag when the security tag was in motion and during time slots of a plurality of time slots that are allocated to other security tags.

10. The method according to claim 6, further comprising outputting an alert from the security tag when authorization of the security tag's detachment is not verified by the enterprise system.

11. A system, comprising:
a security tag configured to:
receive an authorization code from an external device, the authorization code comprising a security tag identifier, the security tap identifier signed using a cryptographic key of a plurality of cryptographic keys that are respectively assigned to a plurality of security tags;
verify a signature of the authorization code; and
responsive to the verification of the authorization code's signature, perform detach operations to mechanically detach the security tag from an item or deactivation operations to disable a response by the security tag to an interrogation signal from a Radio Frequency Identification ("RFID") system or an Electronic Article Surveillance ("EAS") system.

12. The system according to claim 11, further comprising a Point Of Sale ("POS") terminal configured to communicate the authorization code to the security tag.

13. The system according to claim 11, wherein at least one of the detach operations and the deactivation operations comprise setting a status bit to a value indicating that the security tag is coupled to an article that no longer constitutes inventory to be sold or loaned.

14. The system according to claim 13, wherein the detach operations further comprise withdrawing a pin of the security tag, withdrawing a pad of the security tag, or actuating a first mechanical component of the security tag to allow motion of a second mechanical component of the security tag.

15. The system according to claim 11, further comprising an enterprise system that is notified of the security tag's mechanical detachment from an item or the disablement of the security tag's ability to respond to the interrogation signal.

16. The system according to claim 15, wherein the enterprise system is configured to verify that the security tag was actually removed from the article.

17. The system according to claim 16, wherein the security tag's removal is verified based on contents of captured images.

18. The system according to claim 16, wherein the security tag's removal is verified based on system intelligence of the security tag's motion, the security tag's path of travel through a facility, and the security tag's last known location within the facility.

19. The system according to claim 18, wherein the system intelligence is obtained using information received from the security tag when the security tag was in motion and during time slots of a plurality of time slots that are allocated to other security tags.

20. The system according to claim 16, wherein the security tag is further configured to output an alert when authorization of the security tag's detachment is not verified by the enterprise system.

* * * * *